US009388321B2

(12) United States Patent
Mizushima et al.

(10) Patent No.: US 9,388,321 B2
(45) Date of Patent: Jul. 12, 2016

(54) INK-JET PRINTING METHOD

(71) Applicant: KAO CORPORATION, Tokyo (JP)

(72) Inventors: Ryuma Mizushima, Wakayama (JP); Tetsuya Eguchi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 14/653,136

(22) PCT Filed: Dec. 10, 2013

(86) PCT No.: PCT/JP2013/083538
§ 371 (c)(1),
(2) Date: Jun. 17, 2015

(87) PCT Pub. No.: WO2014/098002
PCT Pub. Date: Jun. 26, 2014

(65) Prior Publication Data

US 2015/0344713 A1 Dec. 3, 2015

(30) Foreign Application Priority Data

Dec. 18, 2012 (JP) ................................ 2012-276109

(51) Int. Cl.
*B41J 2/01* (2006.01)
*C09D 11/36* (2014.01)
*C09D 133/14* (2006.01)
*B41J 2/21* (2006.01)
*C09D 11/322* (2014.01)
*C09D 11/326* (2014.01)

(52) U.S. Cl.
CPC ............... *C09D 11/36* (2013.01); *B41J 2/2107* (2013.01); *C09D 11/322* (2013.01); *C09D 11/326* (2013.01); *C09D 133/14* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC .................................................... 347/95–105
See application file for complete search history.

(56) References Cited

U.S. PATENT DOCUMENTS

| | | | | |
|---|---|---|---|---|
| 5,641,346 A * | 6/1997 | Mantell | C09D 11/36 | 347/100 |
| 6,110,266 A * | 8/2000 | Gonzalez-Blanco | C09D 11/322 | 106/31.65 |
| 2006/0173096 A1 | 8/2006 | Ota | | |
| 2009/0068359 A1* | 3/2009 | Doi | C09D 11/30 | 427/256 |
| 2010/0076134 A1* | 3/2010 | Yoshida | C09D 11/30 | 524/270 |
| 2010/0245416 A1 | 9/2010 | Ohshima et al. | | |
| 2011/0043578 A1 | 2/2011 | Tojo | | |

FOREIGN PATENT DOCUMENTS

| | | |
|---|---|---|
| JP | 2003-105234 A | 4/2003 |
| JP | 2005-036202 A | 2/2005 |
| JP | 2008-101192 A | 5/2008 |
| JP | 2008-260279 A | 10/2008 |

OTHER PUBLICATIONS

International Search Report issued in PCT/JP2013/083538 dated Mar. 20, 2014.

* cited by examiner

*Primary Examiner* — Manish S Shah
(74) *Attorney, Agent, or Firm* — Birch, Stewart, Kolasch & Birch, LLP

(57) ABSTRACT

The present invention relates to an ink jet printing method for printing images or characters on a recording medium using a water-based ink, in which the water-based ink includes pigment-containing water-insoluble polymer particles A, water-insoluble polymer particles B, an organic solvent C and water; the water-insoluble polymer particles A includes a water-insoluble polymer (a) containing constitutional units derived from an ionic monomer (a-1), an aromatic ring-containing hydrophobic monomer (a-2) and a specific hydrophilic monomer (a-3), the constitutional unit derived from the hydrophilic monomer (a-3) being present in an amount of from 13 to 45% by mass; the organic solvent C includes one or more organic solvents having a boiling point of 90° C. or higher, and has an average boiling point of 250° C. or lower as a weighted mean value; and the recording medium has a water absorption of from 0 to 10 g/m2 as measured in a pure water contact time of 100 ms. The ink-jet printing method is excellent in spreading of the dot size, optical density, gloss and rub fastness when printed on a low-water absorbing recording medium.

18 Claims, No Drawings

INK-JET PRINTING METHOD

FIELD OF THE INVENTION

The present invention relates to an ink-jet printing method and a water-based ink for ink-jet printing.

BACKGROUND OF THE INVENTION

In ink-jet printing methods, droplets of ink are directly projected onto a recording medium from very fine nozzles and allowed to adhere to the recording medium, to form images or characters. The ink-jet printing methods have become rapidly spread because of various advantages such as easiness of full coloration, low cost, capability of using a plain paper as the recording medium, non-contact with printed images or characters, etc.

In recent years, in order to impart a good weathering resistance and a good water resistance to printed matters, an ink containing a pigment as a colorant has been extensively used.

On the other hand, there is an increasing demand for commercial printed matters printed on recording media using a low-liquid absorbing coated paper such as an offset-coated paper, or a non-liquid absorbing resin film such as a polyvinyl chloride resin film, a polypropylene resin film and a polyester resin film.

It is known that when images or characters are printed on the low-liquid absorbing or non-liquid absorbing recording media by the ink-jet printing methods, there tends to occur problems such as slow absorption of liquid components, prolonged drying time owing to poor absorption, and deterioration in rub fastness early after printing. Also, it is known that unlike a plain paper in which a pigment is likely to be penetrated, the low-liquid absorbing or non-liquid absorbing recording media tend to suffer from deposition of pigment particles remaining thereon which are directly susceptible to an external force, so that the images or characters printed on these recording media tend to be deteriorated in rub fastness even after being dried.

In order to solve these conventional problems, ink-jet printing methods using recording media having an ink-absorbing layer have been proposed.

For example, JP 2008-260279A discloses an ink-jet printing method using a recording medium having a pigment-containing coating layer in which an amount of pure water transferred to a surface of the recording medium on which the coating layer is provided, and a pH value of the same surface of the recording medium are controlled to respective specific ranges, and images or characters are printed on such a surface of the recording medium using an ink containing a granular coloring material, an emulsion resin and a surfactant and having a pH value of 8 or more. In addition, JP 2008-260279A proposes a recording apparatus equipped with a drying device.

However, the improvement in recording medium and recording apparatus tends to have problems concerning costs, consumed powder, etc., and therefore it is desirable to improve the composition of inks.

JP 2005-36202A discloses an ink-jet printing method using a water-based ink containing colorant-containing water-insoluble vinyl polymer particles and a void-type glossy medium in which the water-insoluble vinyl polymer is produced from a polyoxyethylene chain-containing (meth) acrylate monomer, a salt-forming group-containing monomer and a hydrophobic monomer.

JP 2008-101192A discloses an ink-jet printing method in which an ink constituted of a solid component containing a colorant and a resin and a liquid component having a boiling point higher than that of water is ejected to print images on a recording medium, and a ratio between the solid component and the liquid component as well as the viscosity of the ink are respectively controlled to specific ranges.

JP 2003-105234A discloses a water-based ink for ink-jet printing which includes a salt-forming group-containing polymer A, a salt-forming group-containing polymer B and/or a salt-forming group-free polymer C in which the amount of a salt-forming group per unit weight of the polymer B is smaller than that per unit weight of the polymer A.

SUMMARY OF THE INVENTION

The present invention relates to the following aspects [1] and [2].

[1] An ink-jet printing method for printing images or characters on a low-water absorbing recording medium using a water-based ink for ink-jet printing, in which the water-based ink includes pigment-containing water-insoluble polymer particles A, water-insoluble polymer particles B, an organic solvent C and water;

a water-insoluble polymer (a) constituting the water-insoluble polymer particles A contains constitutional units derived from specific monomers; and the organic solvent C includes one or more organic solvents having a boiling point of 90° C. or higher, and has an average boiling point of 250° C. or lower as a weighted mean value of boiling points that are weighted by the content (% by mass) of respective organic solvents in the organic solvent C.

[2] A water-based ink for ink-jet printing, including pigment-containing water-insoluble polymer particles A, water-insoluble polymer particles B, an organic solvent C and water, in which a water-insoluble polymer (a) constituting the water-insoluble polymer particles A contains constitutional units derived from specific monomers; and the organic solvent C includes one or more organic solvents having a boiling point of 90° C. or higher, and has an average boiling point of 250° C. or lower as a weighted mean value of boiling points that are weighted by the content (% by mass) of respective organic solvents in the organic solvent C.

DETAILED DESCRIPTION OF THE INVENTION

The conventional technologies concerning the ink-jet printing methods as described in JP 2008-260279A, JP 2005-36202A, JP 2008-101192A and JP 2003-105234A have failed to satisfy the properties of good optical density, and good gloss and rub fastness of the resulting printed images or characters.

The present invention relates to an ink-jet printing method that is excellent in spreading of the dot size, good optical density, and good gloss and rub fastness when printed on a low-water absorbing recording medium.

Meanwhile, the term “low-water absorption” as used in the present invention is intended to mean both concepts of low-water absorption and non-water absorption.

The present inventors have noticed a water-based ink containing pigment-containing water-insoluble polymer particles, another water-insoluble polymer particles and an organic solvent, and have found that when controlling the content of a constitutional unit derived from a hydrophilic monomer having a specific structure which constitutes the water-insoluble polymer to a specific range, combining an organic solvent having a specific boiling point therewith to prepare an ink, and printing images or characters on a low-water absorbing recording medium using the ink, it is possible to solve and overcome the above conventional problems.

That is, the present invention relates to the following aspects [1] and [2].

[1] An ink-jet printing method for printing images or characters on a recording medium using a water-based ink for ink-jet printing, in which the water-based ink includes pigment-containing water-insoluble polymer particles A, water-insoluble polymer particles B, an organic solvent C and water;

the water-insoluble polymer particles A includes a water-insoluble polymer (a) containing a constitutional unit derived from an ionic monomer (a-1), a constitutional unit derived from an aromatic ring-containing hydrophobic monomer (a-2) and a constitutional unit derived from a hydrophilic monomer (a-3) represented by the formula (1);

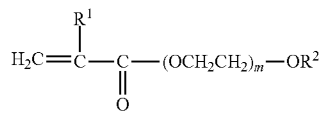

(1)

wherein $R^1$ is a hydrogen atom or a methyl group; $R^2$ is a hydrogen atom, an alkyl group having not less than 1 and not more than 20 carbon atoms or a phenyl group whose hydrogen atom may be substituted with an alkyl group having not less than 1 and not more than 9 carbon atoms; and m represents an average molar number of addition of ethyleneoxy groups and is a number of not less than 7 and not more than 100, the constitutional unit derived from the hydrophilic monomer (a-3) being present in an amount of not less than 13% by mass and not more than 45% by mass on the basis of whole constitutional units in the water-insoluble polymer (a);

the organic solvent C includes one or more organic solvents having a boiling point of 90° C. or higher, and has an average boiling point of 250° C. or lower as a weighted mean value of boiling points that are weighted by the content (% by mass) of respective organic solvents in the organic solvent C; and the recording medium has a water absorption of not less than 0 g/$m^2$ and not more than 10 g/$m^2$ as measured in a pure water contact time of 100 ms.

[2] A water-based ink for ink-jet printing, including pigment-containing water-insoluble polymer particles A, water-insoluble polymer particles B, an organic solvent C and water, in which the water-insoluble polymer particles A includes a water-insoluble polymer (a) containing a constitutional unit derived from an ionic monomer (a-1), a constitutional unit derived from an aromatic ring-containing hydrophobic monomer (a-2) and a constitutional unit derived from a hydrophilic monomer (a-3) represented by the above formula (1), the constitutional unit derived from the hydrophilic monomer (a-3) being present in an amount of not less than 13% by mass and not more than 45% by mass on the basis of whole constitutional units in the water-insoluble polymer (a); and the organic solvent C includes one or more organic solvents having a boiling point of 90° C. or higher, and has an average boiling point of 250° C. or lower as a weighted mean value of boiling points that are weighted by the content (% by mass) of respective organic solvents in the organic solvent C.

According to the present invention, there is provided an ink-jet printing method that is excellent in spreading of the dot size, optical density, gloss and rub fastness when printed on a low-water absorbing recording medium.

[Ink-Jet Printing Method]

The present invention relates to an ink-jet printing method for printing images or characters on a recording medium using a water-based ink for ink-jet printing, in which the water-based ink includes pigment-containing water-insoluble polymer particles A, water-insoluble polymer particles B, an organic solvent C and water;

the water-insoluble polymer particles A include a water-insoluble polymer (a) containing a constitutional unit derived from an ionic monomer (a-1), a constitutional unit derived from an aromatic ring-containing hydrophobic monomer (a-2) and a constitutional unit derived from a hydrophilic monomer (a-3) represented by the above formula (1), the constitutional unit derived from the hydrophilic monomer (a-3) being present in an amount of not less than 13% by mass and not more than 45% by mass on the basis of whole constitutional units in the water-insoluble polymer (a);

the organic solvent C includes one or more organic solvents having a boiling point of 90° C. or higher, and has an average boiling point of 250° C. or lower as a weighted mean value of boiling points that are weighted by the content (% by mass) of respective organic solvents in the organic solvent C; and the recording medium has a water absorption of not less than 0 g/$m^2$ and not more than 10 g/$m^2$ as measured in a pure water contact time of 100 ms.

According to the ink-jet printing method of the present invention, there can be attained such an effect that when printed on a low-water absorbing recording medium by the method, the resulting printed images or characters are excellent in spreading of the dot size, optical density, gloss and rub fastness. The reason therefore is considered as follows although not clearly determined.

The pigment-containing water-insoluble polymer particles A contain a specific amount of the constitutional unit derived from the hydrophilic polymer represented by the above formula (1), and therefore is free from aggregation in water and the organic solvent C having a boiling point of 90° C. or higher and exhibits a reduced viscosity when dried. As a result, it is considered that dots of the ink on a low-water absorbing recording medium are spread, and the resulting printed images or characters are enhanced in optical density and gloss, and further the ink can be prevented from suffering from increase in viscosity owing to inclusion of the water-insoluble polymer and therefore is excellent in ejection property.

In addition, the organic solvent C used in the ink has a average boiling point boiling point of 250° C. or lower as a weighed mean value, so that the drying velocity of the organic solvent itself on the low-water absorbing recording medium becomes high, and the ink is free from aggregation of the water-insoluble polymer particles. As a result, it is considered that the organic solvent is inhibited from being incorporated between the aggregated particles, and therefore the resulting ink can exhibit a higher drying velocity and has enhanced in rub fastness.

<Water-Based Ink for Ink-Jet Printing>

The water-based ink for ink-jet printing according to the present invention includes the pigment-containing water-insoluble polymer particles A, the water-insoluble polymer particles B, the organic solvent C and water.

Meanwhile, the term "water-based" as used herein means that water has the largest content among components of a medium contained in the ink, and an aqueous medium used therefore may be constituted of not only water solely but also a mixed solvent containing water and one or more kinds of organic solvents.

[Pigment-Containing Water-Insoluble Polymer Particles A]

(Pigment)

The pigment used in the present invention may be either an inorganic pigment or an organic pigment.

Examples of the inorganic pigment include carbon blacks and metal oxides. In particular, carbon blacks are preferably used for black water-based inks. The carbon blacks may include furnace blacks, thermal lamp blacks, acetylene blacks and channel blacks.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, and quinophthalone pigments.

The hue of the organic pigment used in the present invention is not particularly limited, and there may be used any chromatic color pigment having a yellow color, a magenta color, a cyan color, a red color, a blue color, an orange color, a green color, etc.

(Water-Insoluble Polymer (a))

The water-insoluble polymer (a) constituting the pigment-containing water-insoluble polymer particles A are used for dispersing the pigment in an aqueous medium and maintaining the resulting dispersion in a stable state, and contains a constitutional unit derived from an ionic monomer (a-1), a constitutional unit derived from an aromatic ring-containing hydrophobic monomer (a-2) and a constitutional unit derived from a hydrophilic monomer (a-3) represented by the formula (1).

The water-insoluble polymer (a) may be produced by subjecting the ionic monomer (a-1), the aromatic ring-containing hydrophobic monomer (a-2) and the hydrophilic monomer (a-3) represented by the formula (1) to addition polymerization by conventionally known methods.

The ionic monomer (a-1) is used as a monomer component of the water-insoluble polymer (a) upon producing the below-mentioned "water dispersion of the pigment-containing water-insoluble polymer particles A" (hereinafter also referred to as a "pigment water dispersion") from the viewpoint of enhancing the dispersion stability of the pigment water dispersion and storage stability of the water-based ink.

Examples of the ionic monomer (a-1) include anionic monomers and cationic monomers. Among these monomers, from the viewpoint of enhancing the dispersion stability of the pigment water dispersion and storage stability of the water-based ink as well as from the viewpoint of improving the ejecting property of the ink, preferred are anionic monomers.

Examples of the anionic monomers include carboxylic acid monomers, sulfonic acid monomers and phosphoric acid monomers.

Specific examples of the carboxylic acid monomers include acrylic acid, methacrylic acid, crotonic acid, itaconic acid, maleic acid, fumaric acid, citraconic acid and 2-methacryloyloxymethylsuccinic acid.

Specific examples of the sulfonic acid monomers include styrenesulfonic acid, 2-acrylamido-2-methylpropanesulfonic acid and 3-sulfopropyl(meth)acrylate.

Specific examples of the phosphoric acid monomers include vinylphosphonic acid, vinyl phosphate, bis(methacryloxyethyl)phosphate, diphenyl-2-acryloyloxyethyl phosphate and diphenyl-2-methacryloyloxyethyl phosphate.

Among the above anionic monomers, from the viewpoint of enhancing a dispersion stability of the pigment water dispersion and a storage stability of the water-based ink, preferred are the carboxylic acid monomers, more preferred are acrylic acid and methacrylic acid, and even more preferred is methacrylic acid.

The aromatic ring-containing hydrophobic monomer (a-2) is used as a monomer component of the water-insoluble polymer (a) from the viewpoint of enhancing the dispersion stability of the pigment water dispersion and storage stability of the water-based ink as well as from the viewpoint of improving the rub fastness of the ink when printed on a low-water absorbing recording medium.

The aromatic ring-containing hydrophobic monomer (a-2) is at least one monomer selected from the group consisting of a styrene-based monomer, an aromatic group-containing (meth)acrylate and a styrene-based macromonomer. Meanwhile, the term "(meth)acrylate" means both an acrylate and a methacrylate, and is hereinafter defined in the same way.

As the styrene-based monomer, from the viewpoint of enhancing a dispersion stability of the pigment water dispersion and a storage stability of the water-based ink, preferred are styrene and 2-methyl styrene, and more preferred is styrene.

As the aromatic group-containing (meth)acrylate, from the viewpoint of enhancing the dispersion stability of the pigment water dispersion and storage stability of the water-based ink as well as from the viewpoint of improving rub fastness of the ink when printed on a low-water absorbing recording medium, preferred are benzyl(meth)acrylate and phenoxyethyl(meth)acrylate, and more preferred is benzyl(meth)acrylate.

The styrene-based macromonomer is a compound having a number-average molecular weight of not less than 500 and not more than 100,000 which contains a polymerizable functional group at one terminal end thereof. The number-average molecular weight of the styrene-based macromonomer is preferably not less than 1,000 and not more than 10,000 from the viewpoint of enhancing the dispersion stability of the pigment water dispersion and storage stability of the water-based ink as well as from the viewpoint of improving the rub fastness of the ink when printed on a low-water absorbing recording medium. Meanwhile, the number-average molecular weight may be measured by gel permeation chromatography using chloroform containing 1 mmol/L of dodecyldimethylamine as a solvent and polystyrene as a reference standard substance.

Examples of the commercially available styrene-based macromonomer includes AS-6(S), AN-6(S) and HS-6(S) (tradenames available from Toagosei Co., Ltd.), etc.

As the aromatic ring-containing hydrophobic monomer (a-2), from the viewpoint of enhancing dispersion stability of the pigment water dispersion and storage stability of the water-based ink as well as from the viewpoint of improving rub fastness of the ink when printed on a low-water absorbing recording medium, preferred is at least one compound selected from the group consisting of an aromatic group-containing (meth)acrylate and a styrene-based macromonomer, more preferred is the combination of an aromatic group-containing (meth)acrylate and a styrene-based macromonomer, and even more preferred is the combination of benzyl(meth)acrylate and a styrene-based macromonomer.

The hydrophilic monomer represented by the formula (1) is used as a monomer component of the water-insoluble polymer (a) from the viewpoint of reducing viscosity of the ink upon evaporating the solvent therefrom, increasing the dot size of the ink and enhancing optical density and gloss of the ink when printed on a low-water absorbing recording medium as well as from the viewpoint of improving the storage stability and ejection property of the water-based ink:

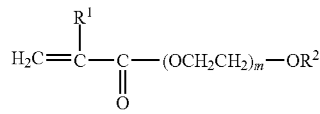

(1)

wherein $R^1$ is a hydrogen atom or a methyl group; $R^2$ is a hydrogen atom, an alkyl group having not less than 1 and not more than 20 carbon atoms or a phenyl group whose hydrogen atom may be substituted with an alkyl group having not less than 1 and not more than 9 carbon atoms; and m represents an average molar number of addition of ethyleneoxy groups and is a number of not less than 7 and not more than 100.

In the above formula (1), $R^1$ is a hydrogen atom or a methyl group, and preferably a methyl group from the viewpoint of enhancing the dispersion stability of the pigment water dispersion and storage stability of the water-based ink.

$R^2$ is a hydrogen atom, an alkyl group having not less than 1 and not more than 20 carbon atoms or a phenyl group whose hydrogen atom may be substituted with an alkyl group having not less than 1 and not more than 9 carbon atoms. $R^2$ is preferably a hydrogen atom or an alkyl group having not less than 1 and not more than 20 carbon atoms, more preferably an alkyl group having not less than 1 and not more than 3 carbon atoms and even more preferably a methyl group from the viewpoint of enhancing the dispersion stability of the pigment water dispersion and storage stability of the water-based ink.

In the above formula (1), m is a number of not less than 7 and not more than 100. From the viewpoint of reducing viscosity of the ink upon evaporating the solvent therefrom, increasing the dot size of the ink and enhancing the optical density and gloss of the ink when printed on a low-water absorbing recording medium as well as from the viewpoint of improving storage stability and ejection property of the water-based ink, m is preferably not less than 9, more preferably not less than 12, even more preferably not less than 16 and further even more preferably not less than 20, and is also preferably not more than 90, more preferably not more than 70, even more preferably not more than 55 and further even more preferably not more than 25.

From the viewpoint of enhancing optical density of the printed images or characters, m is preferably from 12 to 90, more preferably from 16 to 70 and even more preferably from 20 to 55. Also, from the viewpoint of enhancing gloss of the printed images or characters, m is preferably from 12 to 90, more preferably from 25 to 90 and even more preferably from 25 to 70. Thus, m is preferably not less than 12, more preferably not less than 16, even more preferably not less than 20 and further even more preferably not less than 25, and is also preferably not more than 90, more preferably not more than 70, even more preferably not more than 55 and further even more preferably not more than 25.

From the total viewpoints, m is preferably from 12 to 90, more preferably from 16 to 70, even more preferably from 20 to 55, and further even more preferably from 20 to 25.

Preferred examples of the monomer (a-3) represented by the above formula (1) include at least one monomer selected from the group consisting of polyethylene glycol mono (meth)acrylate, methoxy polyethylene glycol mono(meth) acrylate, octoxy polyethylene glycol mono(meth)acrylate and stearoyloxy polyethylene glycol mono(meth)acrylate. Among these monomers, more preferred is methoxy polyethylene glycol mono(meth)acrylate.

Specific examples of the commercially available monomer represented by the above formula (1) include "NK Ester M-90G", "NK Ester M-230G", "NK Ester M-450G" and "NK Ester M-900G" all available from Shin-Nakamura Kagaku Kogyo Co., Ltd., and "LIGHT ESTER 041MA" available from Kyoeisha Chemical Co., Ltd.

The water-insoluble polymer (a) used in the present invention may also contain other monomers than the ionic monomer (a-1), the aromatic ring-containing hydrophobic monomer (a-2) and the hydrophilic monomer (a-3) represented by the formula (1) unless the desired effects of the present invention are adversely affected.

Examples of the other monomers include alkyl(meth)acrylates having 1 to 22 carbon atoms such as methyl(meth) acrylate and 2-ethylhexyl(meth)acrylate, hydroxyalkyl (meth)acrylates such as 2-hydroxyethyl(meth)acrylate and 3-hydroxyethyl(meth)acrylate, and silicone-based macromonomers such as organopolysiloxanes having a polymerizable functional group at one terminal end thereof.

Upon production of the water-insoluble polymer (a), the contents of the above monomers (a-1), (a-2) and (a-3) in a mixture containing these monomers (hereinafter also referred to merely as a "monomer mixture") (contents of non-neutralized components; hereinafter defined in the same way) or the contents of the constitutional units derived from the monomers (a-1), (a-2) and (a-3) in the water-insoluble polymer (a) are as follows.

The content of the ionic monomer (a-1) is preferably not less than 3% by mass, more preferably not less than 5% by mass and even more preferably not less than 8% by mass, and is also preferably not more than 40% by mass, more preferably not more than 25% by mass and even more preferably 20% by mass from the viewpoint of enhancing a dispersion stability of the pigment water dispersion and a storage stability of the water-based ink.

The content of the aromatic ring-containing hydrophobic monomer (a-2) is preferably not less than 20% by mass, more preferably not less than 40% by mass and even more preferably not less than 50% by mass, and is also preferably not more than 80% by mass, more preferably not more than 75% by mass and even more preferably 70% by mass from the viewpoint of enhancing the dispersion stability of the pigment water dispersion and storage stability of the water-based ink as well as from the viewpoint of improving rub fastness of the ink when printed on a low-water absorbing recording medium.

The content of the styrene-based macromonomer used as the monomer (a-2) is preferably not less than 5% by mass and more preferably not less than 8% by mass, and is also preferably not more than 15% by mass and more preferably not more than 12% by mass from the viewpoint of enhancing the dispersion stability of the pigment water dispersion and storage stability of the water-based ink as well as from the viewpoint of improving rub fastness of the ink when printed on a low-water absorbing recording medium.

The content of the hydrophilic monomer (a-3) is preferably from 13 to 45% by mass, more preferably from 15 to 35% by mass and even more preferably from 18 to 25% by mass from the viewpoint of reducing viscosity of the ink upon evaporating the solvent therefrom, increasing the dot size of the ink and enhancing optical density and gloss of the ink when printed on a low-water absorbing recording medium as well as from the viewpoint of improving storage stability and ejection property of the water-based ink. Thus, the content of the hydrophilic monomer (a-3) is preferably not less than 15% by mass and more preferably not less than 18% by mass, and is also preferably not more than 35% by mass and more preferably not more than 25% by mass.

The mass ratio of the component (a-1) to a sum of the component (a-2) and the component (a-3) {component (a-1)/[component (a-2)+component (a-3)]} is preferably not less than 0.03, more preferably not less than 0.05 and even more preferably not less than 0.10, and is also preferably not more than 0.50, more preferably not more than 0.30 and even more preferably not more than 0.20 from the viewpoint of enhancing the dispersion stability of the pigment water dispersion and storage stability of the water-based ink.

(Production of Water-Insoluble Polymer (a))

The water-insoluble polymer (a) may be produced by copolymerizing the above monomer mixture by known polymerization methods. Among the polymerization methods, preferred is a solution polymerization method.

The organic solvent (a) used in the solution polymerization method is not particularly limited, and is preferably at least one compound selected from the group consisting of ketones having not less than 4 and not more than 8 carbon atoms, alcohols, ethers and esters from the viewpoint of enhancing productivity of the below-mentioned water dispersion of the pigment-containing water-insoluble polymer particles A. Of these compounds, preferred are ketones having not less than 4 and not more than 8 carbon atoms, and more preferred is methyl ethyl ketone.

The polymerization may be carried out in the presence of a polymerization initiator or a chain transfer agent. As the polymerization initiator, preferred are azo compounds, and more preferred is 2,2'-azobis(2,4-dimethylvaleronitrile).

As the chain transfer agent, preferred are mercaptans, and more preferred is 2-mercaptoethanol.

The preferred polymerization conditions may vary depending upon the kind of polymerization initiator used, etc. The polymerization temperature is preferably not lower than 50° C. and not higher than 90° C., and the polymerization time is preferably not shorter than 1 h and not longer than 20 h. Further, the polymerization is preferably conducted in an inert gas atmosphere such as nitrogen atmosphere and argon.

After completion of the polymerization reaction, the polymer thus produced may be isolated from the reaction solution by a known method such as reprecipitation and removal of solvent by distillation. The thus obtained polymer may be subjected to reprecipitation, membrane separation, chromatography, extraction, etc., for removing unreacted monomers, etc., therefrom.

The water-insoluble polymer (a) is preferably used as such in the form of a polymer solution without removing the organic solvent (a) used in the polymerization reaction therefrom in order to use the organic solvent (a) as the below-mentioned organic solvent (b) from the viewpoint of enhancing productivity of the water dispersion of the pigment-containing water-insoluble polymer particles A.

The solid content of a solution of the water-insoluble polymer (a) is preferably not less than 30% by mass and more preferably not less than 40% by mass, and is also preferably not more than 60% by mass and more preferably not more than 50% by mass from the viewpoint of enhancing productivity of the water dispersion of the pigment-containing water-insoluble polymer particles A.

The weight-average molecular weight of the water-insoluble polymer (a) used in the present invention is preferably not less than 10,000, more preferably not less than 15,000 and even more preferably not less than 20,000 from the viewpoint of enhancing the dispersion stability of the pigment water dispersion and storage stability of the water-based ink, and is also preferably not more than 150,000, more preferably not more than 100,000, even more preferably not more than 60,000 and further even more preferably not more than 40,000 from the viewpoint of reducing viscosity of the ink upon evaporating the organic solvent C therefrom, increasing the dot size of the ink and enhancing optical density and gloss of the ink when printed on a low-water absorbing recording medium as well as from the viewpoint of improving storage stability and ejection property of the water-based ink. Meanwhile, the weight-average molecular weight of the water-insoluble polymer may be measured by the method described in Examples below.

(Production of Pigment-Containing Water-Insoluble Polymer Particles A)

The pigment-containing water-insoluble polymer particles A are preferably used in the form of a pigment water dispersion, and used in the water-based ink for ink-jet printing from the viewpoint of enhancing productivity of the water-based ink.

The water dispersion of the pigment-containing water-insoluble polymer particles A (pigment water dispersion) may be produced by the process including the following steps (1) and (2).

Step (1): subjecting a mixture of the water-insoluble polymer (a), the organic solvent (b), the pigment and water (hereinafter also referred to as a "pigment mixture") to dispersion treatment to obtain a dispersion treatment product; and Step (2): removing the organic solvent (b) from the dispersion treatment product obtained in step (1) to obtain a pigment water dispersion.

<Step (1)>

In step (1), the mixture of the water-insoluble polymer (a), the organic solvent (b), the pigment and water (pigment mixture) was subjected to dispersion treatment to obtain the dispersion treatment product.

In step (1), first, the water-insoluble polymer (a), the organic solvent (b), the pigment and water, if required, together with a neutralizing agent, a surfactant and the like, are preferably mixed with each other to obtain the pigment mixture. The order of addition of the respective components is not particularly limited, and it is preferred that the water-insoluble polymer (a), the organic solvent (b), the neutralizing agent, water and the pigment are successively added in this order.

(Organic Solvent (b))

The organic solvent (b) is not particularly limited, and is preferably selected from aliphatic alcohols having not less than 1 and not more than 3 carbon atoms, ketones having not less than 4 and not more than 8 carbon atoms, ethers, esters and the like. Of these organic solvents, from the viewpoint of improving wettability to the pigment, solubility of the water-insoluble polymer (a) and adsorbing property of the water-insoluble polymer (a) to the pigment, more preferred are ketones having not less than 4 and not more than 8 carbon atoms, even more preferred are methyl ethyl ketone and methyl isobutyl ketone, and even more preferred is methyl ethyl ketone.

The mass ratio of the water-insoluble polymer (a) to the organic solvent (b) [water-insoluble polymer (a)/organic solvent (b)] is preferably not less than 0.10, more preferably not less than 0.15 and even more preferably not less than 0.20, and is also preferably not more than 0.60, more preferably not more than 0.50 and even more preferably not more than 0.40 from the viewpoint of improving wettability to the pigment and adsorbing property of the water-insoluble polymer (a) to the pigment.

(Neutralizing Agent)

In the present invention, from the viewpoint of enhancing the dispersion stability of the pigment water dispersion as well as the storage stability and ejection property of the water-based ink, there may be used a neutralizing agent. When using the neutralizing agent, the pH value of the pigment water dispersion is preferably controlled to not less than 7 and more preferably not less than 7.5, and is also preferably controlled to not more than 11 and more preferably not more than 9.5.

Examples of the neutralizing agent include hydroxides of alkali metals, ammonia and organic amines.

Specific examples of the hydroxides of alkali metals include lithium hydroxide, sodium hydroxide, potassium hydroxide and cesium hydroxide. Among these hydroxides of alkali metals, preferred is sodium hydroxide.

Specific examples of the organic amines include trimethylamine, ethylamine, diethylamine, triethylamine and triethanolamine.

As the neutralizing agent, from the viewpoint of enhancing the dispersion stability of the pigment water dispersion as well as the storage stability and ejection property of the water-based ink, preferred are the hydroxides of alkali metals and ammonia, and more preferred is the combination of sodium hydroxide and ammonia.

The neutralizing agent is preferably used in the form of an aqueous neutralizing agent solution from the viewpoint of accelerating neutralization of the polymer in a sufficient and uniform manner. From the same viewpoints, the concentration of the aqueous neutralizing agent solution is preferably not less than 3% by mass, more preferably not less than 10% by mass and even even more preferably not less than 15% by mass, and is also preferably not more than 30% by mass and more preferably not more than 25% by mass.

The mass ratio of the aqueous neutralizing agent solution to the organic solvent (b) [aqueous neutralizing agent solution/organic solvent (b)] is preferably not less than 0.01, more preferably not less than 0.05 and even more preferably not less than 0.10, and is also preferably not more than 0.50, more preferably not more than 0.30 and even more preferably not more than 0.20 from the viewpoint of accelerating adsorption of the water-insoluble polymer (a) to the pigment and neutralization of the polymer, enhancing the dispersion stability of the pigment water dispersion and storage stability of the water-based ink, reducing formation of coarse particles, and improving ejection property of the water-based ink.

The neutralizing agent and the aqueous neutralizing agent solution may be respectively used alone or in the form of a mixture of any two or more kinds thereof.

The degree of neutralization of the water-insoluble polymer (a) is preferably not less than 30 mol %, more preferably not less than 40 mol % and even more preferably not less than 50 mol %, and is also preferably not more than 300 mol %, more preferably not more than 200 mol % and even more preferably not more than 150 mol % from the viewpoint of enhancing dispersion stability of the pigment water dispersion and storage stability of the water-based ink, reducing formation of coarse particles, and improving ejection property of the water-based ink.

The degree of neutralization of the polymer by the hydroxides of alkali metals among the above neutralizing agents is preferably not less than 30 mol %, more preferably not less than 40 mol % and even more preferably not less than 50 mol %, and is also preferably not more than 150 mol %, more preferably not more than 125 mol % and even more preferably not more than 100 mol %.

The degree of neutralization of the polymer by the neutralizing agent means the value calculated by dividing a mole equivalent amount of the neutralizing agent by a molar amount of an anionic group in the water-insoluble polymer (a).

(Contents of Respective Components, etc.)

The content of the pigment in the pigment mixture is preferably not less than 10% by mass, more preferably not less than 12% by mass and even more preferably not less than 15% by mass, and is also preferably not more than 30% by mass, more preferably not more than 25% by mass and even more preferably not more than 20% by mass from the viewpoint of enhancing the dispersion stability of the pigment water dispersion and storage stability and ejection property of the water-based ink as well as from the viewpoint of improving productivity of the pigment water dispersion.

The content of the water-insoluble polymer (a) in the pigment mixture is preferably not less than 2.0% by mass, more preferably not less than 4.0% by mass and even more preferably not less than 5.0% by mass, and is also preferably not more than 15% by mass, more preferably not more than 10% by mass and even more preferably not more than 8.0% by mass from the viewpoint of enhancing the dispersion stability of the pigment water dispersion and storage stability and ejection property of the water-based ink.

The content of the organic solvent (b) in the pigment mixture is preferably not less than 10% by mass, more preferably not less than 12% by mass and even more preferably not less than 15% by mass, and is also preferably not more than 35% by mass, more preferably not more than 30% by mass and even more preferably not more than 25% by mass from the viewpoint of improving wettability to the pigment and adsorbing property of the water-insoluble polymer (a) to the pigment.

The content of water in the pigment mixture is preferably not less than 40% by mass, more preferably not less than 45% by mass and even more preferably not less than 50% by mass, and is also preferably not more than 75% by mass, more preferably not more than 70% by mass and even more preferably not more than 65% by mass from the viewpoint of enhancing dispersion stability of the pigment water dispersion as well as from the viewpoint of improving productivity of the pigment water dispersion.

The mass ratio of the pigment to the water-insoluble polymer (a) [pigment/water-insoluble polymer (a)] is preferably from 30/70 to 90/10, more preferably from 50/50 to 85/15 and even more preferably from 70/30 to 80/20 from the viewpoint of reducing viscosity of the ink upon evaporating the solvent therefrom, increasing the dot size of the ink and enhancing optical density and gloss of the ink when printed on a low-water absorbing recording medium as well as from the viewpoint of improving the storage stability and ejection property of the water-based ink. Thus, the mass ratio of the pigment to the water-insoluble polymer (a) [pigment/water-insoluble polymer (a)] is preferably not less than 30/70, more preferably not less than 50/50 and even more preferably not less than 70/30, and is also preferably not more than 90/10, more preferably not more than 85/15 and even more preferably not more than 80/20.

(Dispersion of Pigment Mixture)

In step (1), the pigment mixture is further dispersed to obtain a dispersion treatment product. The dispersing method for obtaining the dispersion treatment product in step (1) is not particularly limited. The pigment particles may be finely atomized into fine particles having a desired average particle size only by a substantial dispersion treatment. Preferably, the pigment mixture is first subjected to a preliminary dispersion treatment, and then to the substantial dispersion treatment by applying a shear stress thereto so as to control the average particle size of the obtained pigment particles to a desired value.

The temperature used in the preliminary dispersion treatment in step (1) is preferably not lower than 0° C., and is also preferably not higher than 40° C., more preferably not higher than 30° C. and even more preferably not higher than 20° C. The dispersing time is preferably not shorter than 0.5 h and more preferably not shorter than 1 h, and is also preferably not longer than 30 h, more preferably not longer than 10 h and even more preferably not longer than 5 h.

When subjecting the pigment mixture to the preliminary dispersion treatment, there may be used ordinary mixing or stirring devices such as anchor blades and disper blades. Of these devices, preferred are high-speed stirring mixers.

As a means for applying shear stress to the pigment mixture in the substantial dispersion treatment, there may be used, for example, kneading machines such as roll mills and kneaders, high-pressure homogenizers such as "Micro Fluidizer" (available from Microfluidics Inc.), and media-type dispersers such as paint shakers and beads mills. Examples of the commercially available media-type dispersers include "Ultra Apex Mill" (available from Kotobuki Industries Co., Ltd.) and "Pico Mill" (available from Asada Iron Works Co., Ltd.). These devices may be used in combination of any two or more thereof. Among these devices, the high-pressure homogenizers are preferably used from the viewpoint of reducing the particle size of the pigment.

When conducting the substantial dispersion treatment using the high-pressure homogenizers, it is possible to adjust the particle size of the pigment to a desired value by controlling the pressure used in the substantial dispersion treatment or frequency of passing the dispersion through the devices.

The pressure used in the substantial dispersion treatment is not less than 60 MPa, more preferably not less than 100 MPa and even more preferably not less than 130 MPa, and is also preferably not more than 200 MPa, more preferably not more than 180 MPa and even more preferably not more than 160 MPa from the viewpoint of enhancing productivity and economy.

The frequency of passing the dispersion through the devices is preferably not less than 3 passes, more preferably not less than 10 passes and even more preferably not less than 15 passes, and is also preferably not more than 30 passes and more preferably not more than 25 passes.

<Step (2)>

In step (2), the organic solvent (b) is removed from the dispersion treatment product obtained in step (1) to obtain a pigment water dispersion. The removal of the organic pigment (b) may be conducted by conventionally known methods.

From the viewpoint of suppressing generation of aggregates in the step of removing the organic solvent (b) and enhancing the dispersion stability of the pigment water dispersion as well as storage stability and ejection property of the water-based ink, it is preferred that water is added to the dispersion treatment product obtained in step (1) before removing the organic solvent (b) therefrom to control the mass ratio of the organic solvent (b) to water (organic solvent (b)/water).

The mass ratio of the organic solvent (b) to water (organic solvent (b)/water) is preferably not less than 0.08 and more preferably not less than 0.10, and is also preferably not more than 0.40 and more preferably not more than 0.20.

The concentration of non-volatile components (solid content) in the pigment water dispersion after controlling the mass ratio of the organic solvent (b) to water (organic solvent (b)/water) is preferably not less than 5% by mass, more preferably not less than 8% by mass and even more preferably not less than 10% by mass, and is also preferably not more than 30% by mass, more preferably not more than 20% by mass and even more preferably not more than 16% by mass, from the viewpoint of suppressing generation of aggregates in the step of removing the organic solvent (b) as well as from the viewpoint of improving productivity of the pigment water dispersion. Meanwhile, a part of water contained in the pigment water dispersion may be removed simultaneously with the organic solvent (b).

Examples of the apparatus for removing the organic solvent (b) in the step (2) include a thin film distillation apparatus such as a batch simple distillation device, a reduced pressure distillation device and a flash evaporator, a rotary distillation device and a stirring evaporator. Among these apparatuses, from the viewpoint of efficient removal of the organic solvent (b), preferred are a rotary distillation device and a stirring evaporator, more preferred is a rotary distillation device, and even more preferred is a rotary evaporator.

The temperature of the dispersion treatment product upon removal of the organic solvent (b) may appropriately vary depending upon the kind of organic solvent (b) to be removed. The temperature of the dispersion treatment product upon removal of the organic solvent (b) as measured under reduced pressure is preferably not lower than 20° C., more preferably not lower than 25° C. and even more preferably not lower than 30° C., and is also preferably not higher than 80° C., more preferably not higher than 70° C. and even more preferably not higher than 65° C.

The pressure of the reaction system upon removal of the organic solvent (b) is preferably not less than 0.01 MPa, more preferably not less than 0.02 MPa and even more preferably not less than 0.05 MPa, and is also preferably not more than 0.5 MPa, more preferably not more than 0.2 MPa and even more preferably not more than 0.1 MPa.

The time required for removal of the organic solvent (b) is preferably not shorter than 1 h, more preferably not shorter than 2 h and even more preferably not shorter than 5 h, and is also preferably not longer than 24 h, more preferably not longer than 12 h and even more preferably not longer than 10 h.

The removal of the organic solvent (b) is continued until the solid content of the resulting dispersion treatment product reaches preferably not less than 10% by mass and more preferably not less than 20% by mass, and also until the solid content of the resulting dispersion treatment product reaches preferably not more than 35% by mass and more preferably not more than 30% by mass.

The resulting concentrated product is preferably subjected to centrifugal separation treatment, and the thus separated liquid layer portion is filtered to obtain the pigment water dispersion. More specifically, the thus obtained concentrated product is preferably subjected to centrifugal separation treatment to separate the concentrated product into a liquid layer portion and a solid portion, thereby recovering the liquid layer portion. The thus recovered liquid layer portion is mainly formed of a dispersion containing the pigment-containing water-insoluble polymer particles A dispersed in water, whereas the solid portion is mainly formed of coarse particles produced owing to defective dispersion or aggregation. Therefore, the pigment water dispersion is obtained from the liquid layer portion.

Also, from the viewpoint of preventing the resulting pigment water dispersion from being dried and suffering from putrefaction thereof, a humectant such as glycerin, an antiseptic agent or a mildew-proof agent may be added to the pigment water dispersion.

The organic solvent (b) is preferably substantially completely removed from the thus obtained pigment water dispersion. However, the residual organic solvent (b) may be present in the pigment water dispersion unless the objects and effects of the present invention are adversely affected by the residual organic solvent. The content of the residual organic solvent (b) in the resulting pigment water dispersion is preferably not more than 0.1% by mass and more preferably not more than 0.01% by mass.

The concentration of the non-volatile components (solid content) in the resulting pigment water dispersion is preferably not less than 10% by mass and more preferably not less than 15% by mass, and is also preferably not more than 30% by mass and more preferably not more than 25% by mass from the viewpoint of enhancing dispersion stability of the pigment water dispersion as well as from the viewpoint of facilitating preparation of the water-based ink.

In the thus-obtained pigment water dispersion, solid components of the pigment and the water-insoluble polymer (a) are dispersed in water as a main dispersing medium.

The average particle size of the pigment-containing water-insoluble polymer particles A in the pigment water dispersion is preferably not less than 40 nm, more preferably not less than 60 nm and even more preferably not less than 75 nm, and is also preferably not more than 150 nm, more preferably not more than 120 nm, even more preferably not more than 110 nm and further even more preferably not more than 100 nm from the viewpoint of accelerating adsorption of the water-insoluble polymer (a) to the pigment and neutralization of the polymer to improve dispersion stability of the pigment water dispersion and, as a result, from the viewpoint of suppressing formation of coarse particles and improving ejection property of the water-based ink, and further from the viewpoint of reducing the viscosity of the ink upon evaporating the solvent therefrom, increasing the dot size of the ink and enhancing optical density and gloss of the ink when printed on a low-water absorbing recording medium.

Meanwhile, the average particle size of the pigment-containing water-insoluble polymer particles A may be measured by the method described in Examples below.

The average particle size of the pigment-containing water-insoluble polymer particles A in the water-based ink is preferably not less than 40 nm, more preferably not less than 60 nm and even more preferably not less than 75 nm, and is also preferably not more than 150 nm, more preferably not more than 120 nm, even more preferably not more than 110 nm and further even more preferably not more than 100 nm from the viewpoint of accelerating adsorption of the water-insoluble polymer (a) to the pigment and neutralization of the polymer to improve dispersion stability of the pigment water dispersion and, as a result, from the viewpoint of suppressing formation of coarse particles and improving ejection property of the water-based ink, and further from the viewpoint of reducing the viscosity of the ink upon evaporating the solvent therefrom, increasing the dot size of the ink and enhancing optical density and gloss of the ink when printed on a low-water absorbing recording medium.

(Amount and Content of Components Compounded in Water-Based Ink for Ink-Jet Printing)

The amount of the pigment water dispersion compounded in the water-based ink is preferably not less than 10% by mass, more preferably not less than 15% by mass and even more preferably not less than 20% by mass from the viewpoint of promoting drying of the ink on the surface of paper and improving rub fastness and optical density of the ink when printed on a low-water absorbing recording medium, and is also preferably not more than 50% by mass, more preferably not more than 40% by mass and even more preferably not more than 35% by mass from the viewpoint of reducing viscosity of the ink upon evaporating the solvent therefrom, increasing the dot size of the ink and enhancing optical density and gloss of the ink when printed on a low-water absorbing recording medium as well as from the viewpoint of improving storage stability and ejection property of the water-based ink.

The content of the pigment-containing water-insoluble polymer particles A in the water-based ink is preferably not less than 1% by mass, more preferably not less than 3% by mass and even more preferably not less than 4% by mass from the viewpoint of promoting drying of the ink on the surface of paper and improving rub fastness and optical density of the ink when printed on a low-water absorbing recording medium, and is also preferably not more than 20% by mass, more preferably not more than 10% by mass and even more preferably not more than 8% by mass from the viewpoint of reducing viscosity of the ink upon evaporating the solvent therefrom, increasing the dot size of the ink and enhancing optical density and gloss of the ink when printed on a low-water absorbing recording medium as well as from the viewpoint of improving storage stability and ejection property of the water-based ink.

The content of the pigment in the water-based ink is preferably not less than 1% by mass, more preferably not less than 2% by mass and even more preferably not less than 3% by mass from the viewpoint of promoting drying of the ink on the surface of paper and improving optical density of the ink when printed on a low-water absorbing recording medium, and is also preferably not more than 15% by mass, more preferably not more than 10% by mass and even more preferably not more than 6% by mass from the viewpoint of reducing viscosity of the ink upon evaporating the solvent therefrom, increasing the dot size of the ink and enhancing optical density and gloss of the ink when printed on a low-water absorbing recording medium as well as from the viewpoint of improving storage stability and ejection property of the water-based ink.

The content of the water-insoluble polymer (a) in the water-based ink is preferably not less than 0.5% by mass, more preferably not less than 0.8% by mass and even more preferably not less than 1% by mass from the viewpoint of enhancing storage stability and ejection property of the water-based ink and improving rub fastness of printed images or characters when printed on a low-water absorbing recording medium, and is also preferably not more than 6% by mass, more preferably not more than 3% by mass and even more preferably not more than 2% by mass from the viewpoint of reducing viscosity of the ink upon evaporating the solvent therefrom, increasing the dot size of the ink and enhancing optical density and gloss of the ink when printed on a low-water absorbing recording medium as well as from the viewpoint of improving storage stability and ejection property of the water-based ink.

[Water-Insoluble Polymer Particles B]

The water-based ink for ink-jet printing as used in the present invention contains the water-insoluble polymer particles B from the viewpoint of promoting drying of the ink on the surface of a recording medium (paper) for ink-jet printing and improving rub fastness of printed images or characters when printed on a low-water absorbing recording medium.

As the water-insoluble polymer particles B, there may be used optional water-insoluble polymer particles. The water-insoluble polymer particles B may be used in the form of a dispersion prepared by dispersing the water-insoluble polymer particles B in water as a continuous phase, and may also contain a dispersant such as a surfactant, if required. The dispersion of the water-insoluble polymer particles B also acts as a fixing emulsion for fixing ink droplets ejected from ink-jet nozzles on a recording medium and improving optical density, gloss and rub fastness of the printed images or characters.

The water-insoluble polymer particles B may also contain a colorant such as pigments and dyes, but preferably contain no colorant from the viewpoint of improving storage stability and ejection property of the water-based ink.

The content of the water-insoluble polymer particles B in the dispersion containing the water-insoluble polymer particles B is preferably not less than 10% by mass, more preferably not less than 20% by mass and even more preferably not less than 30% by mass, and is also preferably not more than 70% by mass, more preferably not more than 60% by mass and even more preferably not more than 55% by mass from the viewpoint of enhancing dispersion stability of the water-insoluble polymer particles B and for convenience of formulation of the ink.

The average particle size of the water-insoluble polymer particles B in the dispersion containing the water-insoluble polymer particles B or the water-based ink is preferably not less than 10 nm, more preferably not less than 30 nm and even more preferably not less than 50 nm, and is also preferably not more than 300 nm, more preferably not more than 150 nm and even more preferably not more than 100 nm from the viewpoint of enhancing storage stability of the water-based ink and improving optical density and gloss of the ink when printed on a low-water absorbing recording medium.

Meanwhile, the average particle size of the water-insoluble polymer particles B may be measured by the method described in Examples below.

Examples of the resin components of the water-insoluble polymer particles B include an acrylic resin, a styrene-based resin, a urethane-based resin, a polyester-based resin, a styrene-acryl-based resin, a butadiene-based resin, a styrene-butadiene-based resin, a vinyl chloride-based resin, a vinyl acetate-based resin and an acrylic silicone-based resin. Among these resin components, preferred is an acrylic resin from the viewpoint of promoting drying of the ink on the surface of paper and improving rub fastness of the printed images or characters when printed on a low-water absorbing recording medium.

In addition, the water-insoluble polymer particles B used in the present invention are preferably used in the form of a dispersion containing the water-insoluble polymer particles B from the viewpoint of improving productivity of the water-based ink.

The water-insoluble polymer particles B may be either an appropriately synthesized product or a commercially available product.

Examples of the commercially available product of the water-insoluble polymer particles B include acrylic resins such as "Neocryl A1127" (anionic self-crosslinked aqueous acrylic resin available from DSM NeoResins, Inc.), "JONCRYL 390" (available from BASF Japan, Ltd.), urethane resins such as "WBR-2018" and "WBR-2000U" (both available from Taisei Fine Chemical Co., Ltd.), styrene-butadiene resins such as "SR-100" and "SR102" (both available from Nippon A & L Inc.), styrene-acrylic resins such as "JONCRYL 7100", "JONCRYL 737" and "JONCRYL 538" (all available from BASF Japan, Ltd.), and vinyl chloride-based resins such as "VINYBLAN 701" (Nissin Chemical Industry Co., Ltd.).

The mass ratio of the pigment to the water-insoluble polymer particles B [pigment/water-insoluble polymer particles B] is preferably not less than 100/300, more preferably not less than 100/200 and even more preferably not less than 100/150, and is also preferably not more than 100/25, more preferably not more than 100/50 and even more preferably not more than 100/70 from the viewpoint of promoting drying of printed images or characters and improving rub fastness, optical density and gloss of the printed images or characters when printed on a low-water absorbing recording medium. Thus, the mass ratio of the pigment to the water-insoluble polymer particles B [pigment/water-insoluble polymer particles B] is preferably from 100/25 to 100/300, more preferably from 100/50 to 100/200 and even more preferably from 100/70 to 100/150.

The content of the water-insoluble polymer particles B in the water-based ink for ink-jet printing used in the present invention is preferably not less than 1.0% by mass, more preferably not less than 2.0% by mass and even more preferably not less than 3.0% by mass from the viewpoint of improving rub fastness of printed images or characters when printed on a low-water absorbing recording medium, and is also preferably not more than 10% by mass, more preferably not more than 8.0% by mass and even more preferably not more than 6.0% by mass from the viewpoint of reducing the viscosity of the ink upon evaporating the solvent therefrom, increasing the dot size of the ink and enhancing optical density and gloss of the ink when printed on a low-water absorbing recording medium as well as from the viewpoint of improving the storage stability and ejection property of the water-based ink.

[Organic Solvent C]

The water-based ink for ink-jet printing as used in the present invention contains the organic solvent C from the viewpoint of enhancing the ejection property of the water-based ink. The organic solvent C contains one or more organic solvents having a boiling point of 90° C. or higher, and has an average boiling point boiling point of 250° C. or lower as a weighted mean value of boiling points that are weighted by the content (% by mass) of respective organic solvents in the organic solvent C. When using two or more organic solvents as the organic solvent C, a plurality of organic solvents that have different boiling points from each other are preferably used.

The average boiling point boiling point of the organic solvent C as the weighted mean value is preferably not lower than 150° C. and more preferably not lower than 180° C. from the viewpoint of preventing dry-out of the ink in ink-jet nozzles, and is also preferably not higher than 240° C., more preferably not higher than 230° C. and even more preferably not higher than 220° C. from the viewpoint of promoting drying of printed images or characters and improving rub fastness of the printed images or characters when printed on a low-water absorbing recording medium.

As the boiling point of an organic solvent is lowered, the saturated vapor pressure and evaporation rate of the organic solvent as measured at a predetermined temperature are increased. In addition, as a proportion of the organic solvent having a high evaporation rate in a mixed organic solvent as measured at a predetermined temperature is increased, the evaporation rate of the mixed organic solvent as measured at the predetermined temperature is increased. Therefore, the weighted mean value of the boiling point of the organic solvent C is regarded as an index of the evaporation rate of the mixed solvent.

Meanwhile, the weighted mean value of the boiling point of the organic solvent C having, for example, a glycerin content of 10% by mass and a propylene glycol content of 30% by mass is 214° C. as the value calculated from the following formula.

[glycerin content (% by mass)×boiling point of glycerin (290° C.)]+[propylene glycol content (% by mass)×boiling point of propylene glycol (188° C.)]/[glycerin content (% by mass)+propylene glycol content (% by mass)]=[[0.1×290° C.]+[0.3×188°]]/[0.1+0.3]=214° C.

Examples of the compound used as the organic solvent C include polyhydric alcohols, polyhydric alcohol alkyl ethers, nitrogen-containing heterocyclic compounds, amides, amines and sulfur-containing compounds. Among these compounds, from the viewpoint of improving the storage stability and ejection property of the water-based ink, preferred is at least one compound selected from the group consisting of polyhydric alcohols and polyhydric alcohol alkyl ethers, and more preferred are polyhydric alcohols. The polyhydric alcohols may be in the form of a mixed alcohol containing a plurality of compounds belonging to the concept of polyhydric alcohols, and the polyhydric alcohol alkyl ethers may also be in the form of a mixed ether containing a plurality of compounds belonging to the concept of polyhydric alcohol alkyl ethers.

The content of at least one compound selected from the group consisting of polyhydric alcohols and polyhydric alcohol alkyl ethers in the organic solvent C is preferably not less than 80% by mass, more preferably not less than 90% by mass, even more preferably not less than 95% by mass, further even more preferably substantially 100% by mass, and even more preferably 100% by mass.

Examples of the polyhydric alcohols include ethylene glycol (b.p. 197° C.), diethylene glycol (b.p. 244° C.), triethylene glycol (b.p. 285° C.), polyethylene glycol, propylene glycol (b.p. 188° C.), dipropylene glycol (b.p. 232° C.), tripropylene glycol (b.p. 273° C.), polypropylene glycol, 1,3-propanediol (b.p. 210° C.), 1,3-butanediol (b.p. 208° C.), 1,4-butanediol (b.p. 230° C.), 3-methyl-1,3-butanediol (b.p. 203° C.), 1,5-pentanediol (b.p. 242° C.), 1,6-hexanediol (b.p. 250° C.), 2-methyl-2,4-pentanediol (b.p. 196° C.), glycerin (b.p. 290° C.), 1,2,6-hexanetriol (b.p. 178° C.), 1,2,4-butanetriol (b.p. 190° C.), 1,2,3-butanetriol (b.p. 175° C.) and petriol (3-methyl-1,3,5-pentanetriol) (b.p. 216° C.). Triethylene glycol, tripropylene glycol and glycerin may be used in combination with a compound having a boiling point lower than 250° C. Among these polyhydric alcohols, from the viewpoint of attaining excellent spread of the dot size and improving optical density, gloss and rub fastness of the ink when printed on a low-water absorbing recording medium, preferred are glycerin, propylene glycol and diethylene glycol.

Examples of the polyhydric alcohol alkyl ethers include ethylene glycol monoethyl ether (b.p. 135° C.), ethylene glycol monobutyl ether (b.p. 171° C.), diethylene glycol monomethyl ether (b.p. 194° C.), diethylene glycol monoethyl ether (b.p. 202° C.), diethylene glycol monobutyl ether (b.p. 230° C.), triethylene glycol monomethyl ether (b.p. 122° C.), triethylene glycol monobutyl ether (b.p. 276° C.), triethylene glycol monoisobutyl ether (b.p. 160° C.), tetraethylene glycol monomethyl ether (b.p. 158° C.), propylene glycol monoethyl ether (b.p. 133° C.), dipropylene glycol monobutyl ether (b.p. 227° C.), dipropylene glycol monomethyl ether (b.p. 90° C.), tripropylene glycol monomethyl ether (b.p. 100° C.) and tripropylene glycol monobutyl ether. Triethylene glycol monobutyl ether may be used in combination with a compound having a boiling point lower than 250° C. Among these polyhydric alcohol alkyl ethers, from the viewpoint of attaining excellent spread of the dot size and improving optical density, gloss and rub fastness of the ink when printed on a low-water absorbing recording medium, preferred is dipropylene glycol monomethyl ether.

Examples of the nitrogen-containing heterocyclic compounds include N-methyl-2-pyrrolidone (b.p. 202° C.), 2-pyrrolidone (b.p. 245° C.), 1,3-dimethyl imidazoline (b.p. 220° C.) and ϵ-caprolactam (b.p. 136° C.).

Examples of the amides include formamide (b.p. 210° C.), N-methyl formamide (b.p. 199° C.) and N,N-dimethyl formamide (b.p. 153° C.).

Examples of the amines include monoethanolamine (b.p. 170° C.), diethanolamine (b.p. 217° C.), triethanolamine (b.p. 208° C.) and triethylamine (b.p. 90° C.).

Examples of the sulfur-containing compounds include dimethyl sulfoxide (b.p. 189° C.), sulfolane (b.p. 285° C.) and thiodiglycol (b.p. 282° C.). Sulfolane and thiodiglycol may be used in combination with a compound having a boiling point lower than 250° C.

Among these compounds, from the viewpoint of attaining excellent spread of the dot size and improving optical density, gloss and rub fastness of the ink when printed on a low-water absorbing recording medium as well as from the viewpoint of enhancing ejection property of the ink, preferred is a combination of two or more kinds of polyhydric alcohols, combination of two or more kinds of polyhydric alcohol alkyl ethers and combination of at least one polyhydric alcohol and at least one polyhydric alcohol alkyl ether; more preferred is a combination of two or more kinds of polyhydric alcohols or combination of at least one polyhydric alcohol and at least one polyhydric alcohol alkyl ether; and even more preferred is a combination of at least one compound selected from the group consisting of propylene glycol, diethylene glycol and dipropylene glycol monomethyl ether, and glycerin.

The mass ratio of the organic solvent (X) as the at least one compound selected from the group consisting of propylene glycol, diethylene glycol and dipropylene glycol monomethyl ether to glycerin [organic solvent (X)/glycerin] is preferably not less than 0.5, more preferably not less than 1.0 and even more preferably not less than 2.0 from the viewpoint of promoting drying of printed images or characters and improving rub fastness of the printed images or characters when printed on a low-water absorbing recording medium, and is also preferably not more than 20, more preferably not more than 17 and even more preferably not more than 13 from the viewpoint of enhancing ejection property of the ink.

The content of the organic solvent C in the water-based ink is preferably not less than 20% by mass, more preferably not less than 30% by mass and even more preferably not less than 35% by mass from the viewpoint of enhancing ejection property of the ink, and is also preferably not more than 60% by mass, more preferably not more than 50% by mass and even more preferably not more than 45% by mass from the viewpoint of enhancing storage stability of the water-based ink, as well as from the viewpoint of promoting drying of printed images or characters and improving rub fastness of the printed images or characters when printed on a low-water absorbing recording medium.

The total content of propylene glycol, diethylene glycol, dipropylene glycol monomethyl ether and glycerin in the water-based ink is preferably not less than 20% by mass, more preferably not less than 30% by mass and even more preferably not less than 35% by mass from the viewpoint of enhancing ejection property of the ink, and is also preferably not more than 60% by mass, more preferably not more than 50% by mass and even more preferably not more than 45% by mass from the viewpoint of enhancing the storage stability of the water-based ink, as well as from the viewpoint of promoting drying of printed images or characters and improving rub fastness of the printed images or characters when printed on a low-water absorbing recording medium.

The total content of propylene glycol, diethylene glycol, dipropylene glycol monomethyl ether and glycerin in the organic solvent C is preferably not less than 80% by mass, more preferably not less than 90% by mass, even more preferably not less than 95% by mass and further even more preferably substantially 100% by mass from the viewpoint of enhancing the ejection property of the ink, as well as from the viewpoint of promoting drying of printed images or characters and improving rub fastness of the printed images or characters when printed on a low-water absorbing recording medium.

The total content of propylene glycol and diethylene glycol in the water-based ink is preferably not less than 15% by mass, more preferably not less than 20% by mass and even more preferably not less than 25% by mass from the viewpoint of attaining excellent spread of the dot size and improving optical density, gloss and rub fastness of the ink when printed on a low-water absorbing recording medium, and is also preferably not more than 55% by mass, more preferably not more than 45% by mass and even more preferably not more than 40% by mass from the same viewpoints as described above.

The content of dipropylene glycol monomethyl ether in the water-based ink is preferably not less than 1% by mass, more preferably not less than 1.5% by mass and even more preferably not less than 2% by mass from the viewpoint of attaining excellent spread of the dot size and improving optical density, gloss and rub fastness of the ink when printed on a low-water absorbing recording medium, and is also preferably not more than 30% by mass, more preferably not more than 10% by mass and even more preferably not more than 5% by mass from the same viewpoints as described above.

The content of glycerin in the water-based ink is preferably not less than 1% by mass, more preferably not less than 3% by mass and even more preferably not less than 5% by mass from the viewpoint of enhancing ejection property of the ink, and is also preferably not more than 20% by mass, more preferably not more than 15% by mass and even more preferably not more than 10% by mass from the viewpoint of attaining excellent spread of the dot size and improving optical density, gloss and rub fastness of the ink when printed on a low-water absorbing recording medium.

[Water]

The content of water in the water-based ink for ink-jet printing is preferably not less than 20% by mass, more preferably not less than 30% by mass and even more preferably not less than 40% by mass from the viewpoint of attaining excellent spread of the dot size and improving optical density, gloss and rub fastness of the ink when printed on a low-water absorbing recording medium as well as from the viewpoint of enhancing storage stability of the water-based ink, and is also preferably not more than 70% by mass, more preferably not more than 65% by mass and even more preferably not more than 60% by mass from the viewpoint of enhancing ejection property of the ink.

[Other Components]

The water-based ink for ink-jet printing according to the present invention may also contain various ordinary additives such as a wetting agent, a penetrant, a dispersant, a surfactant, a viscosity controller, a defoaming agent, an antiseptic agent, a mildew-proof agent and a rust preventive.

[Process for Producing Water-Based Ink for Ink-Jet Printing]

The water-based ink of ink-jet printing may be produced by mixing a water dispersion of the pigment-containing water-insoluble polymer particles A, the water-insoluble polymer particles B, water and the organic solvent C, if required, together with a surfactant, etc., with each other while stirring. Upon the mixing, the water-insoluble polymer particles A and the water-insoluble polymer particles B are preferably added and mixed in this order from the viewpoint of suppressing aggregation of these particles.

[Properties of Ink]

The viscosity of the water-based ink for ink-jet printing as measured at 32° C. is preferably not less than 2.0 mPa·s; more preferably not less than 3.0 mPa·s and even more preferably not less than 5.0 mPa·s from the viewpoint of enhancing ejection property of the water-based ink, and is also preferably not more than 12 mPa·s, more preferably not more than 9.0 mPa·s and even more preferably not more than 7.0 mPa·s from the viewpoint of enhancing the storage stability and ejection property of the water-based ink.

Meanwhile, the viscosity of the water-based ink at 32° C. may be measured by the method described in Examples below.

The pH value of the water-based ink for ink-jet printing is preferably not less than 7.0, more preferably not less than 8.0 and even more preferably not less than 8.5 from the viewpoint of enhancing the storage stability and ejection property of the water-based ink and from the viewpoint of attaining excellent spread of the dot size and improving optical density, gloss and rub fastness of the ink when printed on a low-water absorbing recording medium, and is also preferably not more than 11.0, more preferably not more than 10.0 and even more preferably 9.5 from the viewpoint of improving resistance of members to the ink and suppressing skin irritation. Meanwhile, the pH value of the water-based ink may be measured by the method described in Examples below.

<Recording Medium for Ink-Jet Printing>

[Water Absorption]

The water absorption of a recording medium for ink-jet printing as measured in a pure water contact time of 100 ms is not less than 0 g/m$^2$ and not more than 10 g/m$^2$. More specifically, the water absorption of the recording medium for ink-jet printing as measured in a pure water contact time of 100 ms is preferably not less than 1.0 g/m$^2$, more preferably not less than 2.0 g/m$^2$, even more preferably not less than 3.0 g/m$^2$ and further even more preferably not less than 4.0 g/m$^2$ from the viewpoint of promoting drying of printed images or characters and enhancing rub fastness of the printed images or characters, and is also preferably not more than 8.0 g/m$^2$, more preferably not more than 7.0 g/m$^2$, even more preferably not more than 6.0 g/m$^2$ and further even more preferably not more than 5.5 g/m$^2$ from the viewpoint of enhancing optical density and gloss of the ink.

Meanwhile, the water absorption of the recording medium for ink-jet printing as measured in a pure water contact time of 100 ms may be measured by the method described in Examples below.

[Properties]

The 60° gloss of the recording medium is preferably not less than 5, more preferably not less than 20 and even more preferably not less than 30, and is also preferably not more than 200, from the viewpoint of enhancing gloss and visibility of printed images or characters. The 60° gloss of the recording medium may be measured by a gloss meter "HANDY GLOSSMETER, Model No.: PG-1M" available from Nippon Denshoku Industries Co., Ltd.

The recording medium for ink-jet printing used in the present invention may be a coated paper or a film.

Examples of the coated paper include "OK Topcoat+" (available from Oji Paper Co., Ltd.; basis weight: 104.7 g/m$^2$; 60° gloss: 49.0; water absorption as measured in a pure water contact time of 100 ms (hereinafter defined in the same way): 4.9 g/m$^2$), a multi-color foam gloss coated paper (available from Oji Paper Co., Ltd.; basis weight: 104.7 g/m$^2$; 60° gloss: 36.8; water absorption: 5.2 g/m$^2$), "UPM Finesse Gloss" (available from UPM; basis weight: 115 g/m$^2$; 60° gloss: 27.0; water absorption: 3.1 g/m$^2$), "UPM Finesse Matt" (available from UPM; basis weight: 115 g/m$^2$; 60° gloss: 5.6; water absorption: 4.4 g/m$^2$), "TerraPress Silk" (available from Stora Enso; basis weight: 80 g/m$^2$; 60° gloss: 6.0; water absorption: 4.1 g/m$^2$), and "LumiArt" (available from Stora Enso; basis weight: 90 g/m$^2$; 60° gloss: 26.3).

Examples of the film include a polyester film, a vinyl chloride film, a polypropylene film, a polyethylene film and a nylon film. These films may be subjected to surface treatments such as corona treatment, etc., if required.

Examples of the generally available films include "LUMIRROR T60" (available from Toray Industries Inc.; polyethylene terephthalate; thickness: 125 μm; 60° gloss: 189.1; water absorption: 2.3 g/m$^2$), "PVC80B P" (available from Lintec Corp.; polyvinyl chloride; 60° gloss: 58.8; water absorption: 1.4 g/m$^2$), "KINATH KEE 70CA" (available from Lintec Corp.; polyethylene), "YUPO SG90 PAT1" (available from Lintec Corp.; polypropylene), and "BONYL RX" (available from Kohjin Film & Chemical Co., Ltd.; nylon).

<Ink-Jet Printing Method>

In the ink-jet printing method according to the present invention, the above water-based ink for ink-jet printing is loaded in an ink-jet printing apparatus equipped with an ink ejecting means, and ejected onto the recording medium for ink-jet printing to print images or characters thereon.

The ink-jet printing method may also include the step of drying the images or characters printed on the recording medium for ink-jet printing.

The ink ejecting means may include a thermal-type or piezoelectric-type ink-jet head for ejecting the ink therethrough. Among these methods, the method of ejecting the ink using a piezoelectric-type ink-jet head to print the images or characters is preferably used in the present invention.

<Use of Water-Based Ink for Ink-Jet Printing for Printing>

When using the water-based ink for ink-jet printing according to the present invention for printing, the water-based ink for ink-jet printing is used for printing images or characters on a recording medium having a water absorption of not less than 0 g/m$^2$ and not more than 10 g/m$^2$ as measured in a pure water contact time of 100 ms.

With respect to the aforementioned embodiments, the present invention further provides the following aspects relating to the ink-jet printing methods and water-based inks for ink-jet printing.

<1> An ink-jet printing method for printing images or characters on a recording medium using a water-based ink for ink-jet printing, in which the water-based ink includes pigment-containing water-insoluble polymer particles A, water-insoluble polymer particles B, an organic solvent C and water;

the water-insoluble polymer particles A includes a water-insoluble polymer (a) containing a constitutional unit derived from an ionic monomer (a-1), a constitutional unit derived from an aromatic ring-containing hydrophobic monomer (a-2) and a constitutional unit derived from a hydrophilic monomer (a-3) represented by the above formula (1), the constitutional unit derived from the hydrophilic monomer (a-3) being present in an amount of not less than 13% by mass and not more than 45% by mass on the basis of whole constitutional units in the water-insoluble polymer (a);

the organic solvent C includes one or more organic solvents having a boiling point of 90° C. or higher, and has an average boiling point of 250° C. or lower as a weighted mean value of boiling points that are weighted by the content (% by mass) of respective organic solvents in the organic solvent C; and the recording medium has a water absorption of not less than 0 g/m$^2$ and not more than 10 g/m$^2$ as measured in a pure water contact time of 100 ms.

<2> The ink-jet printing method as described in the aspect <1>, wherein in the formula (1), m is preferably not less than 9, more preferably not less than 12, even more preferably not less than 16 and further even more preferably not less than 20, and is also preferably not more than 90, more preferably not more than 70, even more preferably not more than 55 and further even more preferably not more than 25.

<3> The ink-jet printing method as described in the aspect <1> or <2>, wherein in the formula (1), m is preferably from 12 to 90, more preferably from 16 to 70, even more preferably from 20 to 55 and further even more preferably from 20 to 25.

<4> The ink-jet printing method as described in any one of the aspects <1> to <3>, wherein in the formula (1), $R^2$ is preferably a hydrogen atom or an alkyl group having not less than 1 an not more than 20 carbon atoms, preferably an alkyl group having not less than 1 and not more than 3 carbon atoms and more preferably a methyl group.

<5> The ink-jet printing method as described in any one of the aspects <1> to <4>, wherein in the formula (1), $R^1$ is preferably a methyl group.

<6> The ink-jet printing method as described in any one of the aspects <1> to <5>, wherein the monomer (a-3) is preferably at least one compound selected from the group consisting of polyethylene glycol mono(meth)acrylate, methoxy polyethylene glycol mono(meth)acrylate, octoxy polyethylene glycol mono(meth)acrylate and stearoyloxy polyethylene glycol mono(meth)acrylate, and more preferably methoxy polyethylene glycol mono(meth)acrylate.

<7> The ink-jet printing method as described in any one of the aspects <1> to <6>, wherein the monomer (a-1) is preferably a carboxylic acid monomer, more preferably acrylic acid or methacrylic acid, and even more preferably methacrylic acid.

<8> The ink-jet printing method as described in any one of the aspects <1> to <7>, wherein the monomer (a-2) is preferably at least one monomer selected from the group consisting of a styrene-based monomer, an aromatic group-containing (meth)acrylate and a styrene-based macromonomer, more preferably at least one monomer selected from the group consisting of an aromatic group-containing (meth)acrylate and a styrene-based macromonomer, even more preferably combination of an aromatic group-containing (meth)acrylate and a styrene-based macromonomer, and further even more preferably combination of benzyl(meth)acrylate and a styrene-based macromonomer.

<9> The ink-jet printing method as described in any, one of the aspects <1> to <8>, wherein upon production of the water-insoluble polymer (a), a content of the monomer (a-3) in a monomer mixture containing the monomers (a-1), (a-2) and (a-3) or a content of a constitutional unit derived from the monomer (a-3) in the water-insoluble polymer (a) is preferably not less than 15% by mass and more preferably not less than 18% by mass, and is also preferably not more than 35% by mass and more preferably not more than 25% by mass, and is further preferably from 15 to 35% by mass and more preferably from 18 to 25% by mass.

<10> The ink-jet printing method as described in any one of the aspects <1> to <9>, wherein upon production of the water-insoluble polymer (a), a content of the monomer (a-1) in a monomer mixture containing the monomers (a-1), (a-2) and (a-3), or a content of a constitutional unit derived from the monomer (a-1) in the water-insoluble polymer (a) is preferably not less than 3% by mass, more preferably not less than 5% by mass and even more preferably not less than 8% by mass, and is also preferably not more than 40% by mass, more preferably not more than 25% by mass and even more preferably not more than 20% by mass.

<11> The ink-jet printing method as described in any one of the aspects <1> to <10>, wherein upon production of the water-insoluble polymer (a), a content of the monomer (a-2) in a monomer mixture containing the monomers (a-1), (a-2) and (a-3) or a content of a constitutional unit derived from the monomer (a-2) in the water-insoluble polymer (a) is preferably not less than 20% by mass, more preferably not less than 40% by mass and even more preferably not less than 55% by mass, and is also preferably not more than 80% by mass, more preferably not more than 75% by mass and even more preferably not more than 70% by mass.

<12> The ink-jet printing method as described in any one of the aspects <1> to <11>, wherein upon production of the water-insoluble polymer (a), a content of the styrene-based macromonomer in a monomer mixture containing the monomers (a-1), (a-2) and (a-3) or a content of a constitutional unit derived from the styrene-based macromonomer in the water-insoluble polymer (a) is preferably not less than 5% by mass and more preferably not less than 8% by mass, and is also preferably not more than 15% by mass and more preferably not more than 12% by mass.

<13> The ink-jet printing method as described in any one of the aspects <1> to <12>, wherein a mass ratio of the component (a-1) to a sum of the component (a-2) and the component (a-3) [component (a-1)/[component (a-2)+component (a-3)]] is preferably not less than 0.03, more preferably not less than 0.05 and even more preferably not less than 0.10, and is also preferably not more than 0.50, more preferably not more than 0.30 and even more preferably not more than 0.20.

<14> The ink-jet printing method as described in any one of the aspects <1> to <13>, wherein the average boiling point of the organic solvent C as a weighted mean value is preferably not lower than 150° C. and more preferably not lower than 180° C., and is also preferably not higher than 240° C., more preferably not higher than 230° C. and even more preferably not higher than 220° C.

<15> The ink-jet printing method as described in any one of the aspects <1> to <14>, wherein the organic solvent C is preferably at least one compound selected from the group consisting of a polyhydric alcohol and a polyhydric alcohol alkyl ether, more preferably combination of two or more kinds of polyhydric alcohols, combination of two or more kinds of polyhydric alcohol alkyl ethers or combination of at least one polyhydric alcohol and at least one polyhydric alcohol alkyl ether, even more preferably combination of two or more kinds of polyhydric alcohols or combination of at least one polyhydric alcohol and at least one polyhydric alcohol alkyl ether, and further even more preferably combination of at least one compound selected from the group consisting of propylene glycol, diethylene glycol and dipropylene glycol monomethyl ether, and glycerin.

<16> The ink-jet printing method as described in any one of the aspects <1> to <15>, wherein a content of the at least one compound selected from the group consisting of a polyhydric alcohol and a polyhydric alcohol alkyl ether in the organic solvent C is preferably not less than 80% by mass, more preferably not less than 90% by mass, even more preferably not less than 95% by mass, further even more preferably substantially 100% by mass, and even more preferably 100% by mass.

<17> The ink-jet printing method as described in any one of the aspects <1> to <16>, wherein a mass ratio of at least one organic solvent (X) selected from the group consisting of propylene glycol, diethylene glycol and dipropylene glycol monomethyl ether to glycerin [organic solvent (X)/glycerin] is preferably not less than 0.5, more preferably not less than 1.0 and even more preferably not less than 2.0, and is also preferably not more than 20, more preferably not more than 17 and even more preferably not more than 13.

<18> The ink-jet printing method as described in any one of the aspects <1> to <17>, wherein a content of the pigment-containing water-insoluble polymer particles A in the water-based ink is preferably not less than 1% by mass, more preferably not less than 3% by mass and even more preferably not less than 4% by mass, and is also preferably not more than 20% by mass, more preferably not more than 10% by mass and even more preferably not more than 8% by mass.

<19> The ink-jet printing method as described in any one of the aspects <1> to <18>, wherein a content of the pigment in the water-based ink is preferably not less than 1% by mass, more preferably not less than 2% by mass and even more preferably not less than 3% by mass, and is also preferably not more than 15% by mass, more preferably not more than 10% by mass and even more preferably not more than 6% by mass.

<20> The ink-jet printing method as described in any one of the aspects <1> to <19>, wherein a content of the water-insoluble polymer (a) in the water-based ink is preferably not less than 0.5% by mass, more preferably not less than 0.8% by mass and even more preferably not less than 1% by mass, and is also preferably not more than 6% by mass, more preferably not more than 3% by mass and even more preferably not more than 2% by mass.

<21> The ink-jet printing method as described in any one of the aspects <1> to <20>, wherein a content of the water-insoluble polymer particles B in the water-based ink is preferably not less than 1.0% by mass, more preferably not less than 2.0% by mass and even more preferably not less than 3.0% by mass, and is also preferably not more than 10% by mass, more preferably not more than 8.0% by mass and even more preferably not more than 6.0% by mass.

<22> The ink-jet printing method as described in any one of the aspects <1> to <21>, wherein a mass ratio of the pigment to the water-insoluble polymer particles B [pigment/water-insoluble polymer particles B] is preferably not less than 100/300, more preferably not less than 100/200 and even more preferably not less than 100/150, and is also preferably not more than 100/25, more preferably not more than 100/50 and even more preferably not more than 100/70, and further is preferably from 100/25 to 100/300, more preferably from 100/50 to 100/200 and even more preferably from 100/70 to 100/150.

<23> The ink-jet printing method as described in any one of the aspects <1> to <22>, wherein a content of the organic solvent C in the water-based ink is preferably not less than 20% by mass, more preferably not less than 30% by mass and even more preferably not less than 35% by mass, and is also preferably not more than 60% by mass, more preferably not more than 50% by mass and even more preferably not more than 45% by mass.

<24> The ink-jet printing method as described in any one of the aspects <1> to <23>, wherein a content of glycerin in the water-based ink is preferably not less than 1% by mass, more preferably not less than 3% by mass and even more preferably not less than 5% by mass, and is also preferably not more than 20% by mass, more preferably not more than 15% by mass and even more preferably not more than 10% by mass.

<25> The ink-jet printing method as described in any one of the aspects <1> to <24>, wherein a total content of propylene glycol and diethylene glycol in the water-based ink is preferably not less than 15% by mass, more preferably not less than 20% by mass and even more preferably not less than 25% by mass, and is also preferably not more than 55% by mass, more preferably not more than 45% by mass and even more preferably not more than 40% by mass.

<26> The ink-jet printing method as described in any one of the aspects <1> to <25>, wherein a total content of propylene glycol, diethylene glycol, dipropylene glycol monomethyl ether and glycerin in the water-based ink is preferably not less than 30% by mass and more preferably not less than 35% by mass, and is also preferably not more than 60% by mass, more preferably not more than 50% by mass and even more preferably not more than 45% by mass.

<27> The ink-jet printing method as described in any one of the aspects <1> to <26>, wherein a water absorption of the recording medium for ink-jet printing as measured in a pure water contact time of 100 ms is preferably not less than 1.0 $g/m^2$, more preferably not less than 2.0 $g/m^2$, even more preferably not less than 3.0 $g/m^2$ and further even more preferably not less than 4.0 $g/m^2$, and is also preferably not more than 8.0 $g/m^2$, more preferably not more than 7.0 $g/m^2$, even more preferably not more than 6.0 $g/m^2$ and further even more preferably not more than 5.5 $g/m^2$.

<28> The ink-jet printing method as described in any one of the aspects <1> to <27>, wherein the pigment-containing water-insoluble polymer particles A in the form of a pigment water dispersion are compounded in the water-based ink for ink-jet printing.

<29> The ink-jet printing method as described in any one of the aspects <1> to <28>, wherein the pigment water dispersion of the pigment-containing water-insoluble polymer particles A is produced by the following steps (1) and (2):

Step (1): subjecting a mixture of the water-insoluble polymer (a), the organic solvent (b), the pigment and water to dispersion treatment to obtain a dispersion treatment product; and Step (2): removing the organic solvent (b) from the dispersion treatment product obtained in the step (1) to obtain the pigment water dispersion.

<30> The ink-jet printing method as described in any one of the aspects <1> to <29>, wherein a weight-average molecular weight of the water-insoluble polymer (a) is preferably not less than 10,000, more preferably not less than 15,000 and even more preferably not less than 20,000, and is also preferably not more than 150,000, more preferably not more than 100,000 and even more preferably not more than 60,000.

<31> The ink-jet printing method as described in any one of the aspects <1> to <30>, wherein an average particle size of the pigment-containing water-insoluble polymer particles A in the pigment water dispersion or the water-based ink is preferably not less than 40 nm, more preferably not less than 60 nm and even more preferably not less than 75 nm, and is also preferably not more than 150 nm, more preferably not more than 120 nm, even more preferably not more than 110 nm and further even more preferably not more than 100 nm.

<32> The ink-jet printing method as described in any one of the aspects <1> to <31>, wherein an average particle size of the water-insoluble polymer particles B in the dispersion containing the water-insoluble polymer particles B or the water-based ink is preferably not less than 10 nm, more preferably not less than 30 nm and even more preferably not less than 50 nm, and is also preferably not more than 300 nm, more preferably not more than 150 nm and even more preferably not more than 100 nm.

<33> The ink-jet printing method as described in any one of the aspects <1> to <32>, wherein the water-based ink for ink-jet printing is loaded to an ink-jet printing apparatus equipped with an ink ejecting means, and ejected onto the recording medium for ink-jet printing to print images or characters thereon.

<34> The ink-jet printing method as described in the aspect <33>, wherein the ink ejecting means includes a thermal-type or piezoelectric-type ink-jet head, preferably a piezoelectric-type ink-jet head, for ejecting the ink therethrough.

<35> The ink-jet printing method as described in any one of the aspects <1> to <34>, comprising the steps of printing images or characters on the recording medium for ink-jet printing and then drying the printed images or characters.

<36> A water-based ink for ink-jet printing, including pigment-containing water-insoluble polymer particles A, water-insoluble polymer particles B, an organic solvent C and water, in which the water-insoluble polymer particles A include a water-insoluble polymer (a) containing a constitutional unit derived from an ionic monomer (a-1), a constitutional unit derived from an aromatic ring-containing hydrophobic monomer (a-2) and a constitutional unit derived from a hydrophilic monomer (a-3) represented by the above formula (1), the constitutional unit derived from the hydrophilic monomer (a-3) being present in an amount of not less than 13% by mass and not more than 45% by mass on the basis of whole constitutional units in the water-insoluble polymer (a); and the organic solvent C includes one or more organic solvents having a boiling point of 90° C. or higher, and has an average boiling point of 250° C. or lower as a weighted mean value of boiling points that are weighted by the content (% by mass) of respective organic solvents in the organic solvent C.

<37> The water-based ink for ink-jet printing as described in the aspect <36>, wherein the organic solvent C includes at least one compound selected from the group consisting of a polyhydric alcohol and a polyhydric alcohol alkyl ether.

<38> The water-based ink for ink-jet printing as described in the aspect <36> or <37>, wherein a content of the at least one compound selected from the group consisting of a polyhydric alcohol and a polyhydric alcohol alkyl ether in the organic solvent C is not less than 80% by mass.

<39> The water-based ink for ink-jet printing as described in any one of the aspects <36> to <38>, wherein the organic solvent C includes at least one compound selected from the group consisting of propylene glycol, diethylene glycol and dipropylene glycol monomethyl ether, and glycerin.

<40> The water-based ink for ink-jet printing as described in any one of the aspects <36> to <39>, wherein the aromatic ring-containing hydrophobic monomer (a-2) includes at least one monomer selected from the group consisting of a styrene-based monomer, an aromatic group-containing (meth)acrylate and a styrene-based macromonomer.

EXAMPLES

In the following production examples, examples and comparative examples, the "part(s)" and "%" indicate "part(s) by mass" and "% by mass", respectively, unless otherwise specified.

(1) Measurement of Weight-Average Molecular Weight of Polymer

The weight-average molecular weight of the polymer was measured by gel chromatographic method [GPC apparatus: "HLC-8120GPC" available from Tosoh Corp.; column: "TSK-GEL α-M"×2 available from Tosoh Corp.; flow rate: 1 mL/min)] using N,N-dimethyl formamide in which phosphoric acid and lithium bromide were dissolved in amounts of 60 mmol/L and 50 mmol/L, respectively, as an eluent, and using a polystyrene as a reference standard substance.

(2) Measurement of Average Particle Sizes of Pigment-Containing Water-Insoluble Polymer Particles A and Water-Insoluble Polymer Particles B The particles were subjected to cumulant analysis using a laser particle analyzing system "ELS-8000" (available from Otsuka Electrics Co., Ltd.) to measure the average particle size thereof. The measurement was conducted at a temperature of 25° C., an angle between incident light and detector of 90° and a cumulative frequency of 100 times, and a refractive index of water (1.333) was input to the analyzing system as a refractive index of the dispersing medium. Further, the measurement was conducted by adjusting the concentration of the dispersion to be measured to $5\times10^{-3}$% by mass in terms of the solid content thereof.

Meanwhile, the water-insoluble polymer particles B (anionic self-crosslinked aqueous acrylic resin "Neocryl A1127") used in Examples had an average particle size of 63.2 nm.

(3) Measurement of Solid Content of Pigment Water Dispersion

Ten grams (10.0 g) of sodium sulfate dried to constant weight in a desiccator were weighed and charged in a 30 mL polypropylene container (ϕ: 40 mm; height: 30 mm), and about 1.0 g of a sample was added to the container. The content of the container were mixed and then accurately weighed. The resulting mixture was held in the container at 105° C. for 2 h to remove volatile components therefrom and further allowed to stand in a desiccator for 15 min to measure the mass thereof. The mass of the sample after removing the volatile components therefrom was regarded as a mass of solids therein. The solid content of the sample was calculated by dividing the mass of the solids by the mass of the sample added.

(4) pH of Ink

The pH value of the ink at 25° C. was measured using a bench-top pH meter "F-71" available from Horiba Ltd., equipped with a pH electrode "6337-10D" available from Horiba Ltd.

(5) Viscosity of Ink

The viscosity of the ink was measured at 32° C. using a E-type viscometer "TV-25" (equipped with a standard cone rotor (1° 34'×R24); rotating speed: 50 rpm) available from Told Sangyo Co., Ltd.

(6) Water Absorption of Recording Medium as Measured in Pure Water Contact Time of 100 ms Using an automatic scanning liquid absorptometer "KM500win" available from Kumagai Riki Kogyo Co., Ltd., the amount of pure water transferred to a recording medium when contacted with pure water for 100 ms was measured at 23° C. under a relative humidity of 50%. The thus measured amount of pure water transferred to the recording medium was determined as a water absorption of the recording medium as measured in a pure water contact time of 100 ms. The measuring conditions are shown below.

"Spiral Method"

Contact time: 0.010 to 1.0 (sec)
Pitch (mm): 7
Length Per Sampling (degree): 86.29
Start Radius (mm): 20
End Radius (mm): 60
Min Contact Time (ms): 10
Max Contact Time (ms): 1000
Sampling Pattern (1-50): 50
Number of Sampling Points (>0): 19

"Square Head"

Split Span (mm): 1
Split Width (mm): 5

The values of water absorption of an ordinary gloss coated paper "OK Topcoat+" (available from Oji Paper Co., Ltd.), a PET film "LUMIRROR T60" (available from Toray Industries Inc.; thickness: 125 μm) and a plain paper "4200" (available from Fuji Xerox Co., Ltd.) were 4.9 g/m$^2$, 2.3 g/m$^2$ and 14.0 g/m$^2$, respectively.

Production Examples I-1 to I-12

Production of Water-Insoluble Polymer Solutions 1 to 12

The monomers, solvent, polymerization initiator and chain transfer agent in each column "Initially Charged Monomer Solution" as shown in Tables 1 and 2 were charged into a reaction vessel equipped with two dropping funnels 1 and 2 and mixed with each other, and an inside atmosphere of the reaction vessel was replaced with a nitrogen gas, thereby obtaining an initially charged monomer solution.

On the other hand, the monomers, solvent, polymerization initiator and chain transfer agent in each column "Dropping Monomer Solution 1" as shown in Tables 1 and 2 were mixed with each other to obtain a dropping monomer solution 1. The resulting dropping monomer solution 1 was charged into the dropping funnel 1, and an inside atmosphere of the dropping funnel 1 was replaced with nitrogen gas.

In addition, the monomers, solvent, polymerization initiator and chain transfer agent in each column "Dropping Monomer Solution 2" as shown in Tables 1 and 2 were mixed with each other to obtain a dropping monomer solution 2. The resulting dropping monomer solution 2 was charged into the dropping funnel 2, and the inside atmosphere of the dropping funnel 2 was replaced with nitrogen gas.

In a nitrogen atmosphere, the initially charged monomer solution in the reaction vessel was held at 77° C. while stirring, and the dropping monomer solution 1 in the dropping funnel 1 was gradually added dropwise to the reaction vessel over 3 h. Next, the dropping monomer solution 2 in the dropping funnel 2 was gradually added dropwise to the reaction vessel over 2 h. After completion of the dropwise addition, the mixed solution in the reaction vessel was stirred at 77° C. for 0.5 h. Then, a polymerization initiator solution prepared by dissolving 1.1 parts of the above polymerization initiator 2,2'-azobis(2,4-dimethylvaleronitrile) ("V-65" (tradename) available from Wako Pure Chemical Industries, Ltd.) in 47.3 parts of methyl ethyl ketone was added to the mixed solution, and the resulting reaction solution was aged at 77° C. for 0.5 h while stirring. The above procedure including the preparation and addition of the polymerization initiator solution and the aging of the reaction solution was repeated five more times. Then, after maintaining the reaction solution in the reaction vessel at 80° C. for 1 h, about 200 parts of methyl ethyl ketone were added thereto to adjust the solid content of the reaction solution to 45.2%, thereby obtaining a polymer solution.

The compositions and weight-average molecular weights of the thus obtained water-insoluble polymers 1 to 12 are shown in Table 3.

Meanwhile, the details of the monomers used herein were as follows.

Methacrylic acid: Available from Wako Pure Chemical Industries, Ltd.

Benzyl methacrylate: Available from Wako Pure Chemical Industries, Ltd.

Styrene: Available from Wako Pure Chemical Industries, Ltd.

Styrene macromer: "AS-6S" (available from Toagosei Co., Ltd.; concentration of effective ingredients: 50% by mass; number-average molecular weight: 6000)

Methoxy polyethylene glycol monomethacrylate (m=9): "NK ESTER M-90G" available from Shin-Nakamura Kagaku Kogyo Co., Ltd.

Methoxy polyethylene glycol monomethacrylate (m=23): "NK ESTER TM-230G" available from Shin-Nakamura Kagaku Kogyo Co., Ltd.

Methoxy polyethylene glycol monomethacrylate (m=30): "LIGHT ESTER 041MA" available from Kyoeisha Chemical Co., Ltd.

Methoxy polyethylene glycol monomethacrylate (m=45): "NK ESTER M-450G" available from Shin-Nakamura Kagaku Kogyo Co., Ltd.

Methoxy polyethylene glycol monomethacrylate (m=90): "NK ESTER M-900G" available from Shin-Nakamura Kagaku Kogyo Co., Ltd.

Methoxy polyethylene glycol monomethacrylate (m=4): "NK ESTER M-40G" available from Shin-Nakamura Kagaku Kogyo Co., Ltd.

Methoxy polyethylene glycol monomethacrylate (m=120): Production Example I-13

Polypropylene glycol monomethacrylate: "PP-1000" available from NOF Corp. (molar number of addition of propylene glycol: 5)

Production Example I-13

Production of Methoxy Polyethylene Glycol Monomethacrylate (m=120)

Polyethylene glycol monomethyl ether (weight-average molecular weight: 5312) having a molar number of addition of ethyleneoxide of 120 which had been melted at 80° C. was used to produce methoxy polyethylene glycol monomethacrylate (m=120) as a product according to the method described in Example 1 of JP 11-228636A.

TABLE 1

| | Polymer solution 1 | | | Polymer solution 2 | | | Polymer solution 3 | | |
|---|---|---|---|---|---|---|---|---|---|
| | Initially charged monomer solution (parts) | Dropping monomer solution 1 (parts) | Dropping monomer solution 2 (parts) | Initially charged monomer solution (parts) | Dropping monomer solution 1 (parts) | Dropping monomer solution 2 (parts) | Initially charged monomer solution (parts) | Dropping monomer solution 1 (parts) | Dropping monomer solution 2 (parts) |
| Ionic monomer (a-1) | | | | | | | | | |
| Methacrylic acid | | 72.8 | 18.2 | | 72.8 | 18.2 | | 72.8 | 18.2 |
| Hydrophobic monomer (a-2) | | | | | | | | | |
| Benzyl methacrylate | 39.9 | 319.2 | 39.9 | 39.9 | 319.2 | 39.9 | 39.9 | 319.2 | 39.9 |
| Styrene | | | | | | | | | |
| Styrene macromer (AS-6S) | 14.0 | 126.0 | | 14.0 | 126.0 | | 14.0 | 126.0 | |
| Hydrophilic monomer (a-3) | | | | | | | | | |
| MPEGMA (m = 9) | 14.0 | 112.0 | 14.0 | | | | | | |
| MPEGMA (m = 23) | | | | 14.0 | 112.0 | 14.0 | | | |
| MPEGMA (m = 30) | | | | | | | 14.0 | 112.0 | 14.0 |
| MPEGMA (m = 45) | | | | | | | | | |
| MPEGMA (m = 90) | | | | | | | | | |
| Other monomers | | | | | | | | | |
| MPEGMA (m = 4) | | | | | | | | | |
| MPEGMA (m = 120) | | | | | | | | | |
| PPGMA | | | | | | | | | |
| Solvent | | | | | | | | | |
| Methyl ethyl ketone | 15.8 | 173.3 | 126.0 | 15.8 | 173.3 | 126.0 | 15.8 | 173.3 | 126.0 |
| Polymerization initiator | | | | | | | | | |
| V-65 | | 5.6 | 1.4 | | 5.6 | 1.4 | | 5.6 | 1.4 |
| Chain transfer agent | | | | | | | | | |
| 2-Mercaptoethanol | 0.4 | 2.4 | 0.7 | 0.4 | 2.4 | 0.7 | 0.4 | 2.4 | 0.7 |

| | Polymer solution 4 | | | Polymer solution 5 | | | Polymer solution 6 | | |
|---|---|---|---|---|---|---|---|---|---|
| | Initially charged monomer solution (parts) | Dropping monomer solution 1 (parts) | Dropping monomer solution 2 (parts) | Initially charged monomer solution (parts) | Dropping monomer solution 1 (parts) | Dropping monomer solution 2 (parts) | Initially charged monomer solution (parts) | Dropping monomer solution 1 (parts) | Dropping monomer solution 2 (parts) |
| Ionic monomer (a-1) | | | | | | | | | |
| Methacrylic acid | | 72.8 | 18.2 | | 72.8 | 18.2 | | 72.8 | 18.2 |
| Hydrophobic monomer (a-2) | | | | | | | | | |
| Benzyl methacrylate | 39.9 | 319.2 | 39.9 | 39.9 | 319.2 | 39.9 | 29.4 | 235.2 | 29.4 |
| Styrene | | | | | | | | | |
| Styrene macromer (AS-6S) | 14.0 | 126.0 | | 14.0 | 126.0 | | 14.0 | 126.0 | |

TABLE 1-continued

| | | | | | | | | | |
|---|---|---|---|---|---|---|---|---|---|
| Hydrophilic monomer (a-3) | | | | | | | | | |
| MPEGMA (m = 9) | | | | | | | | | |
| MPEGMA (m = 23) | | | | | | | 24.5 | 196.6 | 24.5 |
| MPEGMA (m = 30) | | | | | | | | | |
| MPEGMA (m = 45) | 14.0 | 112.0 | 14.0 | | | | | | |
| MPEGMA (m = 90) | | | | 14.0 | 112.0 | 14.0 | | | |
| Other monomers | | | | | | | | | |
| MPEGMA (m = 4) | | | | | | | | | |
| MPEGMA (m = 120) | | | | | | | | | |
| PPGMA | | | | | | | | | |
| Solvent | | | | | | | | | |
| Methyl ethyl ketone | 15.8 | 173.3 | 126.0 | 15.8 | 173.3 | 126.0 | 15.8 | 173.2 | 126.0 |
| Polymerization initiator | | | | | | | | | |
| V-65 | | 5.6 | 1.4 | | 5.6 | 1.4 | | 5.6 | 1.4 |
| Chain transfer agent | | | | | | | | | |
| 2-Mercaptoethanol | 0.4 | 2.4 | 0.7 | 0.4 | 2.4 | 0.7 | 0.4 | 2.4 | 0.7 |

Note
MPEGMA: Methoxy polyethylene glycol monomethacrylate
PPGMA: Polypropylene glycol monomethacrylate (molar number of addition of propylene glycol: 5)

TABLE 2

| | Polymer solution 7 | | | Polymer solution 8 | | | Polymer solution 9 | | |
|---|---|---|---|---|---|---|---|---|---|
| | Initially charged monomer solution (parts) | Dropping monomer solution 1 (parts) | Dropping monomer solution 2 (parts) | Initially charged monomer solution (parts) | Dropping monomer solution 1 (parts) | Dropping monomer solution 2 (parts) | Initially charged monomer solution (parts) | Dropping monomer solution 1 (parts) | Dropping monomer solution 2 (parts) |
| Ionic monomer (a-1) | | | | | | | | | |
| Methacrylic acid | | 72.8 | 18.2 | | 72.8 | 18.2 | | 72.8 | 18.2 |
| Hydrophobic monomer (a-2) | | | | | | | | | |
| Benzyl methacrylate | 43.4 | 347.2 | 43.4 | 39.9 | 319.2 | 39.9 | 39.9 | 319.2 | 39.9 |
| Styrene | | | | | | | | | |
| Styrene macromer (AS-6S) | 14.0 | 126.0 | | 14.0 | 126.0 | | 14.0 | 126.0 | |
| Hydrophilic monomer (a-3) | | | | | | | | | |
| MPEGMA (m = 9) | | | | | | | | | |
| MPEGMA (m = 23) | 10.5 | 84.0 | 10.5 | | | | | | |
| MPEGMA (m = 30) | | | | | | | | | |
| MPEGMA (m = 45) | | | | | | | | | |
| MPEGMA (m = 90) | | | | | | | | | |
| Other monomers | | | | | | | | | |
| MPEGMA (m = 4) | | | | 14.0 | 112.0 | 14.0 | | | |
| MPEGMA (m = 120) | | | | | | | 14.0 | 112.0 | 14.0 |
| PPGMA | | | | | | | | | |
| Solvent | | | | | | | | | |
| Methyl ethyl ketone | 15.8 | 173.2 | 126.0 | 15.8 | 173.3 | 126.0 | 15.8 | 173.3 | 126.0 |
| Polymerization initiator | | | | | | | | | |
| V-65 | | 5.6 | 1.4 | | 5.6 | 1.4 | | 5.6 | 1.4 |
| Chain transfer agent | | | | | | | | | |
| 2-Mercaptoethanol | 0.4 | 2.4 | 0.7 | 0.4 | 2.4 | 0.7 | 0.4 | 2.4 | 0.7 |

| | Polymer solution 10 | | | Polymer solution 11 | | | Polymer solution 12 | | |
|---|---|---|---|---|---|---|---|---|---|
| | Initially charged monomer solution (parts) | Dropping monomer solution 1 (parts) | Dropping monomer solution 2 (parts) | Initially charged monomer solution (parts) | Dropping monomer solution 1 (parts) | Dropping monomer solution 2 (parts) | Initially charged monomer solution (parts) | Dropping monomer solution 1 (parts) | Dropping monomer solution 2 (parts) |
| Ionic monomer (a-1) | | | | | | | | | |
| Methacrylic acid | | 72.8 | 18.2 | | 72.8 | 18.2 | | 78.4 | 19.6 |

TABLE 2-continued

| | | | | | | | | | |
|---|---|---|---|---|---|---|---|---|---|
| Hydrophobic monomer (a-2) | | | | | | | | | |
| Benzyl methacrylate | 18.9 | 151.2 | 18.9 | 46.9 | 375.2 | 46.9 | | | |
| Styrene | | | | | | | 32.2 | 257.6 | 32.2 |
| Styrene macromer (AS-6S) | 14.0 | 126.0 | | 14.0 | 126.0 | | 21.0 | 189.0 | |
| Hydrophilic monomer (a-3) | | | | | | | | | |
| MPEGMA (m = 9) | | | | | | | | | |
| MPEGMA (m = 23) | 35.0 | 280.0 | 35.0 | 7.0 | 56.0 | 7.0 | | | |
| MPEGMA (m = 30) | | | | | | | | | |
| MPEGMA (m = 45) | | | | | | | | | |
| MPEGMA (m = 90) | | | | | | | | | |
| Other monomers | | | | | | | | | |
| MPEGMA (m = 4) | | | | | | | | | |
| MPEGMA (m = 120) | | | | | | | | | |
| PPGMA | | | | | | | 17.5 | 140.0 | 17.5 |
| Solvent | | | | | | | | | |
| Methyl ethyl ketone | 15.8 | 173.3 | 126.0 | 15.8 | 173.3 | 126.0 | 15.8 | 173.3 | 126.0 |
| Polymerization initiator | | | | | | | | | |
| V-65 | | 5.6 | 1.4 | | 5.6 | 1.4 | | 5.6 | 1.4 |
| Chain transfer agent | | | | | | | | | |
| 2-Mercaptoethanol | 0.4 | 2.4 | 0.7 | 0.4 | 2.4 | 0.7 | 0.4 | 2.4 | 0.7 |

Note
MPEGMA: Methoxy polyethylene glycol monomethacrylate
PPGMA: Polypropylene glycol monomethacrylate (molar number of addition of propylene glycol: 5)

TABLE 3

| | Water-insoluble polymer (a) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Ionic monomer (a-1) | | | | | | | | | | | | |
| Methacrylic acid | 13 | 13 | 13 | 13 | 13 | 13 | 13 | 13 | 13 | 13 | 13 | 14 |
| Hydrophobic monomer (a-2) | | | | | | | | | | | | |
| Benzyl methacrylate | 57 | 57 | 57 | 57 | 57 | 42 | 62 | 57 | 57 | 27 | 67 | |
| Styrene | | | | | | | | | | | | 46 |
| Styrene macromer (AS-6S) | 10 | 10 | 10 | 10 | 10 | 10 | 10 | 10 | 10 | 10 | 10 | 15 |
| Hydrophilic monomer (a-3) | | | | | | | | | | | | |
| MPEGMA (m = 9) | 20 | | | | | | | | | | | |
| MPEGMA (m = 23) | | 20 | | | | 35 | 15 | | | 50 | 10 | |
| MPEGMA (m = 30) | | | 20 | | | | | | | | | |
| MPEGMA (m = 45) | | | | 20 | | | | | | | | |
| MPEGMA (m = 90) | | | | | 20 | | | | | | | |
| Other monomers | | | | | | | | | | | | |
| MPEGMA (m = 4) | | | | | | | | 20 | | | | |
| MPEGMA (m = 120) | | | | | | | | | 20 | | | |
| PPGMA | | | | | | | | | | | | 25 |
| Weight-average molecular weight | 25112 | 28258 | 36348 | 28681 | 29800 | 28457 | 30720 | 33449 | 29465 | 26760 | 28385 | 27306 |

Production Example II-1

Production of Pigment Water Dispersion 1

The water-insoluble polymer solution (solid content: 45.2%) obtained in Production Example 1 and methyl ethyl ketone (MEK) were mixed with each other in amounts of 44.2 parts and 36.1 parts, respectively, thereby obtaining a water-insoluble polymer MEK solution. The resulting water-insoluble polymer MEK solution was charged into a 2 L-capacity disper, and while stirring the solution at 1400 rpm, 176.8 parts of ion-exchanged water, 6.1 parts of a 5N sodium hydroxide aqueous solution and 1.3 parts of a 25% ammonia aqueous solution were added thereto such that the degree of neutralization of the water-insoluble polymer by sodium hydroxide was adjusted to 85% and the degree of neutralization of the water-insoluble polymer by ammonia was adjusted to 40%. The resulting reaction solution was stirred at 1400 rpm for 15 min while cooling the solution in a water bath at 0° C. Then, 60 parts of carbon black "MONARCH800" available from Cabot Corp., were added to the reaction solution, and the resulting mixture was stirred at 7000 rpm for 3 h. The obtained pigment mixture was subjected to dispersion treatment under a pressure of 150 MPa by passing through a disperser "MICROFLUIDIZER M-110EH-30XP" (available from Microfluidics Corp.) 20 times, thereby obtaining a dispersion treatment product. The resulting dispersion treatment product had a solid content of 25.0%.

A 2 L egg-plant shaped flask was charged with 324.5 parts of the dispersion treatment product obtained in the above step, and then 216.3 parts of ion-exchanged water were added thereto (solid content: 15.0%), and the resulting mixture was held under a pressure of 0.09 MPa in a warm water bath adjusted at 32° C. for 3 h using a reduced-pressure distillation apparatus "Rotary Evaporator N-1000S" available from Tokyo Rikakikai Co., Ltd., operated at a rotating speed of 50 rpm to remove the organic solvent therefrom. Further, the temperature of the warm water bath was adjusted to 62° C., and the pressure was reduced to 0.07 MPa, and the reaction solution was concentrated under this condition until reaching a solid content of 25%.

The thus obtained concentrated solution was charged into a 500 mL angle rotor, and subjected to centrifugal separation using a high-speed cooling centrifuge "himac CR22G" (temperature set: 20° C.) available from Hitachi Koki Co., Ltd., at 7000 rpm for 20 min. Thereafter, the resulting liquid layer portion was filtered through a 5 μm membrane filter "Minisart" available from Sartorius Inc.

Added to 300 parts of the resulting filtrate (pigment: 55.1 parts; water-insoluble polymer: 18.4 parts) were 48.4 parts of ion-exchanged water, and further 18.4 parts of glycerin and 0.74 part of "Ploxel LVS" were added thereto, followed by stirring the resulting mixture at 70° C. or 1 h. The obtained mixture was cooled to 25° C. and then filtered through the above 5 μm filter, and further ion-exchanged water was added to the resulting product to control a solid content thereof to 20.0%, thereby obtaining a pigment water dispersion 1.

The average particle size of the pigment-containing water-insoluble polymer particles contained in the resulting pigment water dispersion 1 is shown in Table 4.

Production Examples II-2 to II-12

Production of Pigment Water Dispersions 2 to 12

The same procedure as in Production Example II-1 was repeated except that the water-insoluble polymer solution 1 was replaced with the respective water-insoluble polymers 2 to 12, thereby obtaining pigment water dispersions 2 to 12. The results are shown in Table 4.

Production Example II-13

Production of Pigment Water Dispersion 13

The same procedure as in Production Example II-1 was repeated except that the water-insoluble polymer solution 1 and the pigment were replaced with the water-insoluble polymer 2 and a cyan pigment "CHROMOFINE BLUE 6338JC" available from Dainichiseika Color & Chemicals Mfg. Co., Ltd., respectively, and the rotating speed used in the centrifugal separation step was changed from 7000 rpm to 3660 rpm, thereby obtaining a pigment water dispersion 13. The results are shown in Table 4.

Production Example II-14

Production of Pigment Water Dispersion 14

The same procedure as in Production Example II-1 was repeated except that the water-insoluble polymer solution 1 and glycerin were replaced with the water-insoluble polymer 2 and ion-exchanged water, respectively, thereby obtaining a pigment water dispersion 14. The results are shown in Table 4.

Production Example II-15

Production of Pigment Water Dispersion 15

The same procedure as in Production Example II-1 was repeated except that the water-insoluble polymer solution 1 and the pigment were replaced with the water-insoluble polymer 2 and a yellow pigment "FASTYELLOW 7414" (C.I. Pigment Yellow 74) available from Sanyo Color Works, Ltd., respectively, and the rotating speed used in the centrifugal separation step was changed from 7000 rpm to 3660 rpm, thereby obtaining a pigment water dispersion 15. The results are shown in Table 4.

Production Example II-16

Production of Pigment Water Dispersion 16

The same procedure as in Production Example II-1 was repeated except that the water-insoluble polymer solution 1 and the pigment were replaced with the water-insoluble polymer 2 and a magenta pigment "CHROMOFINE RED 6111T" (C.I. Pigment Red 122) available from Dainichiseika Color & Chemicals Mfg. Co., Ltd., respectively, thereby obtaining a pigment water dispersion 16. The results are shown in Table 4.

TABLE 4

| | Kind of water-insoluble polymer (a) | Pigment/polymer ratio | Average particle size (nm) | Solid content (% by mass) |
|---|---|---|---|---|
| Pigment water dispersion 1 | Water-insoluble polymer 1 | 75/25 | 87 | 20.0 |
| Pigment water dispersion 2 | Water-insoluble polymer 2 | 75/25 | 85 | 20.0 |
| Pigment water dispersion 3 | Water-insoluble polymer 3 | 75/25 | 91 | 20.0 |
| Pigment water dispersion 4 | Water-insoluble polymer 4 | 75/25 | 85 | 20.0 |
| Pigment water dispersion 5 | Water-insoluble polymer 5 | 75/25 | 83 | 20.0 |
| Pigment water dispersion 6 | Water-insoluble polymer 6 | 75/25 | 84 | 20.0 |
| Pigment water dispersion 7 | Water-insoluble polymer 7 | 75/25 | 86 | 20.0 |
| Pigment water dispersion 8 | Water-insoluble polymer 8 | 75/25 | 82 | 20.0 |
| Pigment water dispersion 9 | Water-insoluble polymer 9 | 75/25 | 82 | 20.0 |
| Pigment water dispersion 10 | Water-insoluble polymer 10 | 75/25 | 103 | 20.0 |
| Pigment water dispersion 11 | Water-insoluble polymer 11 | 75/25 | 94 | 20.0 |
| Pigment water dispersion 12 | Water-insoluble polymer 12 | 75/25 | 81 | 20.0 |
| Pigment water dispersion 13 | Water-insoluble polymer 2 | 75/25 | 93 | 20.0 |
| Pigment water dispersion 14 | Water-insoluble polymer 2 | 75/25 | 85 | 20.0 |
| Pigment water dispersion 15 | Water-insoluble polymer 2 | 75/25 | 124 | 20.0 |
| Pigment water dispersion 16 | Water-insoluble polymer 2 | 75/25 | 112 | 20.0 |

Example 1

Production of Ink 1

The pigment water dispersion 1 was used to prepare a water-based ink 1 for ink-jet printing. The water-based ink 1 was prepared from the following composition A formulated such that the resulting ink contained the pigment and the water-insoluble polymer particles B in amounts of 4% by mass and 5% by mass, respectively, and had a pH value of 9.0.
<Composition A>

| | |
|---|---|
| Pigment water dispersion 1 | 26.67 parts |
| Water-insoluble polymer particles B: Anionic self-crosslinked aqueous acrylic resin "Neocryl A1127" (available from DSM NeoResins, Inc.; solid content: 44% by mass) | 11.36 parts |
| Glycerin (available from Wako Pure Chemical Industries, Ltd.) | 8.67 parts |
| Propylene glycol (available from Wako Pure Chemical Industries, Ltd.) | 30 parts |
| "SURFYNOL 104PG-50" (available from Nissin Chemical Industry Co., Ltd., 2,4,7,9-tetramethyl-5-decyne-4,7-diol(50%), propylene glycol(50%)) | 0.60 part |
| "EMULGEN 120" (available from Kao Corp., polyoxyethylene lauryl ether, HLB15.3) | 0.60 part |
| 1N Sodium hydroxide aqueous solution | 1.42 parts |
| Ion-exchanged water | 20.68 parts |

The resulting mixed solution was filtered through the above 5 μm filter, thereby obtaining the ink 1. Properties of the ink 1 are shown in Table 5.

Meanwhile, the average boiling point of the organic solvent C as a weighted mean value of boiling points that were weighted by contents (% by mass) in the organic solvent C was 213° C. as the value calculated from the following formula.

[glycerin content (% by mass)×boiling point of glycerin (290° C.)]+[propylene glycol content (% by mass)×boiling point of propylene glycol (188° C.)]/[glycerin content (% by mass)+propylene glycol content (% by mass)]=[[0.1×290° C.]+[(0.3+0.003)×188° C.]]/[40.1+0.3+0.003]=213° C.

Meanwhile, in the above calculation formula, the numerical value "0.003" is a content (mass %) of propylene glycol derived from "SURFYNOL 104PG-50", and calculated from the following formula:

0.06 part×0.5=0.3 part=0.003% by mass in ink.

In addition, "0.1% by mass" as a glycerin content is the numerical value calculated from the following formulae:

Amount of pigment water dispersion 1 (glycerin content: 5% by mass)=26.67 parts;

Amount of glycerin derived from the pigment water dispersion 1=26.67×0.05=1.33 parts;

Amount of glycerin compounded in ink=8.67 parts;

Total: 1.33 parts+8.67 parts=10.00 parts=0.1% by mass in ink.

Examples 2 to 7 and 10, and Comparative Examples 1 to 5

Production of Inks 2 to 7 and 10 to 15

The same procedure as in Example 1 was repeated except that the pigment water dispersion 1 was replaced with the respective pigment water dispersions 2 to 13, thereby obtaining inks 2 to 7 and 10 to 15. However, the amounts of 1N sodium hydroxide aqueous solution and ion-exchanged water compounded in the dispersion was adequately adjusted such that the total amount thereof was 22.1 parts, and the pH value of the ink after compounded was 9.0. Properties of the thus obtained inks 2 to 7 and 10 to 15 are shown in Table 5.

Example 8

Production of Ink 8

The pigment water dispersion 6 was used to prepare an ink 8. The ink 8 was prepared from the following composition B formulated such that the resulting ink contained the pigment and the water-insoluble polymer particles B in amounts of 4% by mass and 5% by mass, respectively, and had a pH value of 9.0.
<Composition B>

| | |
|---|---|
| Pigment water dispersion 6 | 26.67 parts |
| Water-insoluble polymer particles B: Anionic self-crosslinked aqueous acrylic resin "Neocryl A1127" (available from DSM NeoResins, Inc.; solid content: 44% by mass) | 11.36 parts |
| Glycerin (available from Wako Pure Chemical Industries, Ltd.) | 1.67 parts |
| Diethylene glycol | 37 parts |
| "SURFYNOL 104PG-50" (available from Nissin Chemical Industry Co., Ltd.) | 0.60 part |
| "EMULGEN 120" (available from Kao Corp.) | 0.60 part |
| 1N Sodium hydroxide aqueous solution | 1.36 parts |
| Ion-exchanged water | 20.74 parts |

The resulting mixed solution was filtered through the above 5 μm filter, thereby obtaining the ink 8. Properties of the ink 8 are shown in Table 5.

Meanwhile, the average boiling point of the organic solvent C as calculated as a weighted mean value of boiling points that were weighted by contents (% by mass) in the organic solvent C was 247° C.

Example 9

Production of Ink 9

The pigment water dispersion 6 was used to prepare an ink 9. The ink 9 was prepared from the following composition C formulated such that the resulting ink contained the pigment and the water-insoluble polymer particles B in amounts of 4% by mass and 5% by mass, respectively, and had a pH value of 9.0.
<Composition C>

| | |
|---|---|
| Pigment water dispersion 6 | 26.67 parts |
| Water-insoluble polymer particles B: Anionic self-crosslinked aqueous acrylic resin "Neocryl A1127" (available from DSM NeoResins, Inc.; solid content: 44% by mass) | 11.36 parts |
| Glycerin (available from Wako Pure Chemical Industries, Ltd.) | 11.67 parts |
| Propylene glycol (available from Wako Pure Chemical Industries, Ltd.) | 24 parts |
| Dipropylene glycol monomethyl ether (available from Wako Pure Chemical Industries, Ltd.) | 3 parts |
| "SURFYNOL 104PG-50" (available from Nissin Chemical Industry Co., Ltd.) | 0.60 part |
| "EMULGEN 120" (available from Kao Corp.) | 0.60 part |
| 1N Sodium hydroxide aqueous solution | 1.41 parts |
| Ion-exchanged water | 20.69 parts |

The resulting mixed solution was filtered through the above 5 μm filter, thereby obtaining the ink 9. Properties of the ink 9 are shown in Table 5.

Meanwhile, the average boiling point of the organic solvent C as calculated as a weighted mean value of boiling points that were weighted by contents (% by mass) in the organic solvent C was 221° C.

Comparative Example 6

Production of Ink 16

The pigment water dispersion 6 was used to prepare an ink 16. The ink 16 was prepared from the following composition D formulated such that the resulting ink contained the pigment and the water-insoluble polymer particles B in amounts of 4% by mass and 5% by mass, respectively, and had a pH value of 9.0.

<Composition D>

| | |
|---|---|
| Pigment water dispersion 6 | 26.67 parts |
| Water-insoluble polymer particles B: Anionic self-crosslinked aqueous acrylic resin "Neocryl A1127" (available from DSM NeoResins, Inc.; solid content: 44% by mass) | 11.36 parts |
| Glycerin (available from Wako Pure Chemical Industries, Ltd.) | 27.67 parts |
| Propylene glycol (available from Wako Pure Chemical Industries, Ltd.) | 10 parts |
| "SURFYNOL 104PG-50" (available from Nissin Chemical Industry Co., Ltd.) | 0.60 part |
| "EMULGEN 120" (available from Kao Corp.) | 0.60 part |
| 1N Sodium hydroxide aqueous solution | 1.36 parts |
| Ion-exchanged water | 21.74 parts |

The resulting mixed solution was filtered through the above 5 μm filter, thereby obtaining the ink 16. Properties of the ink 16 are shown in Table 5.

Meanwhile, the average boiling point of the organic solvent as calculated as a weighted mean value of boiling points that were weighted by contents (% by mass) in the organic solvent was 263° C.

Example 11

Production of Ink 17

The same procedure as in Example 2 using the pigment water dispersion 2 was repeated except that the water-insoluble polymer particles B (as a dispersion of the aqueous acrylic resin "Neocryl A1127") used in the ink 2 were replaced with 12.5 parts of a polyester resin emulsion "POLYESTER WR960" (available from Nippon Synthetic Chemical Industry Co., Ltd.; Tg: 40° C.; solid content: 40% by weight), and the amount of ion-exchanged water used therein was changed to 19.9 parts, thereby obtaining an ink 17. Properties of the ink 17 are shown in Table 5.

Example 12

Production of Ink 18

The same procedure as in Example 2 using the pigment water dispersion 2 was repeated except that the water-insoluble polymer particles B (as a dispersion of the aqueous acrylic resin "Neocryl A1127") used in the ink 2 were replaced with 15.4 parts of a urethane resin emulsion "WBR-2018" (available from Taisei Fine Chemical Co., Ltd.; Tg: 20° C.; solid content: 32.5% by weight), and the amount of ion-exchanged water used therein was changed to 17.0 parts, thereby obtaining an ink 18. Properties of the ink 18 are shown in Table 5.

Example 13

Production of Ink 19

The same procedure as in Example 2 using the pigment water dispersion 2 was repeated except that the water-insoluble polymer particles B (as a dispersion of the aqueous acrylic resin "Neocryl A1127") used in the ink 2 were replaced with 12.5 parts of a vinyl chloride resin emulsion "VINYLBLAN 711" (available from Nissin Chemical Industry Co., Ltd.; Tg: 20° C.; solid content: 40% by weight), and the amount of ion-exchanged water used therein was changed to 19.0 parts, thereby obtaining an ink 19. Properties of the ink 19 are shown in Table 5.

Example 14

Production of Ink 20

The pigment water dispersion 14 was used to prepare a water-based ink 20 for ink-jet printing. The ink 20 was prepared from the following composition E formulated such that the resulting ink contained the pigment and the water-insoluble polymer particles B in amounts of 4% by mass and 5% by mass, respectively, and had a pH value of 9.0.

<Composition E>

| | |
|---|---|
| Pigment water dispersion 14 | 26.7 parts |
| Water-insoluble polymer particles B: Anionic self-crosslinked aqueous acrylic resin "Neocryl A1127" (available from DSM NeoResins, Inc.; solid content: 44% by mass) | 11.4 parts |
| Propylene glycol (available from Wako Pure Chemical Industries, Ltd.) | 37 parts |
| "SURFYNOL 104PG-50" (available from Nissin Chemical Industry Co., Ltd.) | 0.6 part |
| "EMULGEN 120" (available from Kao Corp.) | 0.6 part |
| 1N Sodium hydroxide aqueous solution | 1.36 parts |
| Ion-exchanged water | 22.34 parts |

The resulting mixed solution was filtered through the above 5 μm filter, thereby obtaining the ink 20. Properties of the ink 20 are shown in Table 5.

Meanwhile, the average boiling point of the organic solvent as calculated as a weighted mean value of boiling points that were weighted by contents (% by mass) in the organic solvent was 192° C.

Example 15

Production of Ink 21

The pigment water dispersion 14 was used to prepare a water-based ink 21 for ink-jet printing. The ink 20 was prepared from the following composition F formulated such that the resulting ink contained the pigment and the water-insoluble polymer particles B in amounts of 4% by mass and 5% by mass, respectively, and had a pH value of 9.0.

<Composition F>

| | |
|---|---|
| Pigment water dispersion 14 | 26.7 parts |
| Water-insoluble polymer particles B: Anionic self-crosslinked aqueous acrylic resin "Neocryl A1127" (available from DSM NeoResins, Inc.; solid content: 44% by mass) | 11.4 parts |

-continued

| | |
|---|---|
| Ethylene glycol (available from Wako Pure Chemical Industries, Ltd.) | 38 parts |
| "SURFYNOL 104PG-50" (available from Nissin Chemical Industry Co., Ltd.) | 0.6 part |
| "EMULGEN 120" (available from Kao Corp.) | 0.6 part |
| 1N Sodium hydroxide aqueous solution | 1.36 parts |
| Ion-exchanged water | 21.34 parts |

The resulting mixed solution was filtered through the above 5 μm filter, thereby obtaining the ink 21. Properties of the ink 21 are shown in Table 5.

Meanwhile, the average boiling point of the organic solvent as calculated as a weighted mean value of boiling points that were weighted by contents (% by mass) in the organic solvent was 200° C.

Examples 16 and 17

Production of Inks 22 and 23

The same procedure as in Example 1 was repeated except that the pigment water dispersion 1 was replaced with the respective pigment water dispersions 15 and 16, thereby obtaining inks 22 and 23. However, the amounts of 1N sodium hydroxide aqueous solution and ion-exchanged water compounded in the respective dispersions was adequately adjusted such that the total amount thereof was 22.1 parts, and the pH value of the respective inks after being compounded was 9.0. Properties of the thus obtained inks 22 and 23 are shown in Table 5.

TABLE 5

| | Ink | pH | Viscosity | Kind of water-insoluble polymer (a) | Pigment water dispersion | Weighed mean value of boiling point of organic solvent C *1 | *2 |
|---|---|---|---|---|---|---|---|
| Example 1 | Ink 1 | 9.0 | 6.2 | Water-insoluble polymer 1 | Pigment water dispersion 1 | 214° C. | 213° C. |
| Example 2 | Ink 2 | 9.0 | 6.6 | Water-insoluble polymer 2 | Pigment water dispersion 2 | 214° C. | 213° C. |
| Example 3 | Ink 3 | 9.0 | 6.6 | Water-insoluble polymer 3 | Pigment water dispersion 3 | 214° C. | 213° C. |
| Example 4 | Ink 4 | 9.0 | 6.4 | Water-insoluble polymer 4 | Pigment water dispersion 4 | 214° C. | 213° C. |
| Example 5 | Ink 5 | 9.0 | 6.6 | Water-insoluble polymer 5 | Pigment water dispersion 5 | 214° C. | 213° C. |
| Example 6 | Ink 6 | 9.0 | 6.8 | Water-insoluble polymer 6 | Pigment water dispersion 6 | 214° C. | 213° C. |
| Example 7 | Ink 7 | 9.0 | 6.6 | Water-insoluble polymer 7 | Pigment water dispersion 7 | 214° C. | 213° C. |
| Example 8 | Ink 8 | 9.0 | 5.7 | Water-insoluble polymer 6 | Pigment water dispersion 6 | 248° C. | 247° C. |
| Example 9 | Ink 9 | 9.0 | 6.9 | Water-insoluble polymer 6 | Pigment water dispersion 6 | 222° C. | 221° C. |
| Example 10 | Ink 10 | 9.0 | 5.9 | Water-insoluble polymer 2 | Pigment water dispersion 13 | 214° C. | 213° C. |
| Example 11 | Ink 17 | 9.0 | 6.4 | Water-insoluble polymer 2 | Pigment water dispersion 2 | 214° C. | 213° C. |
| Example 12 | Ink 18 | 9.0 | 6.5 | Water-insoluble polymer 2 | Pigment water dispersion 2 | 214° C. | 213° C. |
| Example 13 | Ink 19 | 9.0 | 6.6 | Water-insoluble polymer 2 | Pigment water dispersion 2 | 214° C. | 213° C. |
| Example 14 | Ink 20 | 9.0 | 6.9 | Water-insoluble polymer 2 | Pigment water dispersion 14 | 193° C. | 192° C. |
| Example 15 | Ink 21 | 9.0 | 6.8 | Water-insoluble polymer 2 | Pigment water dispersion 14 | 201° C. | 200° C. |
| Example 16 | Ink 22 | 9.0 | 6.2 | Water-insoluble polymer 2 | Pigment water dispersion 15 | 214° C. | 213° C. |
| Example 17 | Ink 23 | 9.0 | 6.8 | Water-insoluble polymer 2 | Pigment water dispersion 16 | 214° C. | 213° C. |
| Comparative Example 1 | Ink 11 | 9.0 | 6.2 | Water-insoluble polymer 8 | Pigment water dispersion 8 | 214° C. | 213° C. |
| Comparative Example 2 | Ink 12 | 9.0 | 6.9 | Water-insoluble polymer 9 | Pigment water dispersion 9 | 214° C. | 213° C. |
| Comparative Example 3 | Ink 13 | 9.0 | 7.3 | Water-insoluble polymer 10 | Pigment water dispersion 10 | 214° C. | 213° C. |
| Comparative Example 4 | Ink 14 | 9.0 | 6.5 | Water-insoluble polymer 11 | Pigment water dispersion 11 | 214° C. | 213° C. |
| Comparative Example 5 | Ink 15 | 9.0 | 6.5 | Water-insoluble polymer 12 | Pigment water dispersion 12 | 214° C. | 213° C. |
| Comparative Example 6 | Ink 16 | 9.0 | 6.4 | Water-insoluble polymer 6 | Pigment water dispersion 6 | 264° C. | 263° C. |

Note
*1: Calculated value except for propylene glycol derived from "SURFYNOL 104PG-50".
*2: Calculated value inclusive of propylene glycol derived from "SURFYNOL 104PG-50".

Experimental Example 1

Dot Size (Preparation of Printed Matters)

The commercially available ink-jet printer "GX-2500" (available from Ricoh Company, Ltd.; piezoelectric-type) was loaded with the respective water-based inks obtained in Examples 1 to 17 and Comparative Examples 1 and 4 to 6, and the Duty 10% printing was carried out on an ordinary gloss coated paper "OK Topcoat+" (available from Oji Paper Co., Ltd.; basis weight: 104.7 g/m$^2$) at 23° C. and 50% RH under the printing condition of "gloss coated paper; Kirei; no color matching", thereby obtaining printed matters 1 to 4. The dot size was measured using a handy-type image evaluation system "Model No. PIAS-II" available from QEA Inc., to read out the diameter (μm) of the dots on the Duty 10% printed portions on the obtained print matters. The results are shown in Table 6.

As the dot size increases, the number of overlapped dots increases so that the optical density and gloss become higher.

Experimental Example 2

Spread of Dot Size

As the dot size when printed on a low-water absorbing recording medium increases, the ink is more excellent in picking upon one-pass printing. The dot size has a correlation with the viscosity of the ink when concentrated.

The dot size was evaluated by the viscosity of the ink when concentrated. As the viscosity of the ink is reduced, the ink is more excellent in spread of the dot size as well as ejection property.

(Preparation of Concentrated Ink)

Using a reduced pressure dryer, the inks obtained in Examples 1 to 10 and Comparative Examples 1 and 4 to 6 were respectively concentrated at 60° C. under a pressure of 210 mmHg, thereby preparing inks having a degree of concentration of 60%. Meanwhile, the degree of concentration of the respective inks was calculated from the following formula.

Degree of concentration=(mass of ink after concentrated/mass of initial ink)×100

(Viscosity of Respective Concentrated Inks)

Using a rheometer "MCR301" (available from Anton Paar GmbH; using a cone plate "CP50-1"), the above concentrated inks were subjected to measurement of a stress at 32° C. at an increased shear rate of 100, 200, 300, 400, 500, 600, 700, 800, 900 and 1000. The thus obtained stress-shear rate plot curve was fit by a least squares method to pass through an origin, and a gradient of a straight line portion of the thus fit curve was defined as the viscosity of the concentrated ink. The results are shown in Table 6.

Experimental Example 3

Optical Density (Preparation of Printed Matters)

The commercially available ink-jet printer "GX-2500" (available from Ricoh Company, Ltd.; piezoelectric-type) was loaded with the respective water-based inks obtained in Examples 1 to 10 and Comparative Examples 1 and 4 to 6, and the A4 solid image (monochrome) printing was carried out on an ordinary gloss coated paper "OK Topcoat+" (available from Oji Paper Co., Ltd.; basis weight: 104.7 g/m$^2$) and a polyester film "LUMIRROR T60" (available from Toray Industries Inc.; thickness: 125 μm) at 23° C. and 50% RH under the printing condition of "gloss coated paper; Kirei; no color matching", thereby obtaining the following printed matters 1 to 4.

The printed matter 1 obtained after being printed on the ordinary gloss coated paper was allowed to stand at 23° C. and 50% RH for 24 h and then dried.

The printed matter 2 obtained after being printed on the ordinary gloss coated paper was allowed to stand at 23° C. and 50% RH for 30 min and then dried.

The printed matter 3 obtained after being printed on the ordinary gloss coated paper was heated for 15 s on an analogue hot plate "(NINOS) NA-2" (available from As One Corp.) heated to 100° C. and then dried.

The printed matter 4 obtained after being printed on the polyester film was heated for 5 min on the same hot plate as used above and then dried.

Meanwhile, the printed matters 2 and 3 thus dried were immediately subjected to evaluation of a rub fastness thereof.

(Measurement of Optical Density)

The optical density values of the respective solid image portions on the printed matters 1 and 4 were measured using an optical densitometer "SPECTROEYE" (available from Gretag Macbeth Corp.) in a measuring mode of (DIN, Abs). The results are shown in Table 6. As the measured value increases, the ink is more excellent in optical density.

Experimental Example 4

Gloss

The gloss (20°) of the solid image portion on the printed matter 1 was measured by a gloss meter "HANDY GLOSSMETER, Model No.: PG-1M" available from Nippon Denshoku Industries Co., Ltd. The results are shown in Table 6. As the measured value increases, the ink is more excellent in gloss.

Experimental Example 5

Rub Fastness

The printed matters 1 to 3 were subjected to a rub fastness test in which each printed matter was rubbed with a cotton "BEMCOT M-3" (available from Asahi Kasei Corp.) as a friction material using a Sutherland-type Ink Rub Tester "AB-201" (available from Tester Sangyo Co., Ltd.) under a load of 2000 g 100 times (reciprocating operations). The rubbed printed matter was observed by the naked eyes and evaluated according to the following ratings. The results are shown in Table 6.

(Evaluation Ratings)

○: No peeling occurred x: Peeling occurred

TABLE 6

| | | Dot size | Spread of dot size | Optical density Printed matters | | 20° Gloss Printed | Rub fastness Printed matters | | |
|---|---|---|---|---|---|---|---|---|---|
| | | (μm) | (mPa · s) | 1 | 4 | matter 1 | 1 | 2 | 3 |
| Example 1 | Ink 1 | 62 | 135 | 1.90 | 2.06 | 17.1 | ○ | ○ | ○ |
| Example 2 | Ink 2 | 77 | 82 | 2.30 | — | 23.0 | ○ | ○ | ○ |
| Example 3 | Ink 3 | 63 | 118 | 2.29 | — | 29.0 | ○ | ○ | ○ |

TABLE 6-continued

| | | Dot size | Spread of dot size | Optical density Printed matters | | 20° Gloss Printed | Rub fastness Printed matters | | |
|---|---|---|---|---|---|---|---|---|---|
| | | (μm) | (mPa · s) | 1 | 4 | matter 1 | 1 | 2 | 3 |
| Example 4 | Ink 4 | 72 | 110 | 2.33 | 2.08 | 32.5 | ○ | ○ | ○ |
| Example 5 | Ink 5 | 70 | 120 | 2.23 | 2.04 | 27.6 | ○ | ○ | ○ |
| Example 6 | Ink 6 | 73 | 73 | 2.31 | — | 24.2 | ○ | ○ | ○ |
| Example 7 | Ink 7 | 63 | 130 | 2.01 | — | 20.3 | ○ | ○ | ○ |
| Example 8 | Ink 8 | 71 | 112 | 2.37 | — | 29.2 | ○ | ○ | ○ |
| Example 9 | Ink 9 | 66 | 124 | 2.30 | — | 24.3 | ○ | ○ | ○ |
| Example 10 | Ink 10 | 84 | 58 | 2.36 | — | 20.8 | ○ | ○ | ○ |
| Example 11 | Ink 17 | 84 | 75 | 2.13 | — | 24.5 | ○ | ○ | ○ |
| Example 12 | Ink 18 | 81 | 92 | 2.21 | — | 22.3 | ○ | ○ | ○ |
| Example 13 | Ink 19 | 71 | 105 | 2.24 | — | 21.5 | ○ | ○ | ○ |
| Example 14 | Ink 20 | 70 | 114 | 2.14 | — | 20.2 | ○ | ○ | ○ |
| Example 15 | Ink 21 | 82 | 103 | 2.20 | — | 21.5 | ○ | ○ | ○ |
| Example 16 | Ink 22 | 83 | 70 | 1.80 | — | 24.0 | ○ | ○ | ○ |
| Example 17 | Ink 23 | 70 | 120 | 1.71 | — | 22.3 | ○ | ○ | ○ |
| Comparative Example 1 | Ink 11 | 55 | 140 | 1.73 | — | 14.1 | ○ | ○ | ○ |
| Comparative Example 2 | Ink 12 | Normal ink ejecting operation was not possible and therefore evaluation of printed matters was not possible. | | | | | | | |
| Comparative Example 3 | Ink 13 | Normal ink ejecting operation was not possible and therefore evaluation of printed matters was not possible. | | | | | | | |
| Comparative Example 4 | Ink 14 | 53 | 170 | 1.81 | 1.93 | 16.3 | ○ | ○ | ○ |
| Comparative Example 5 | Ink 15 | 48 | 242 [1)] | 2.08 | — | 17.4 | ○ | ○ | ○ |
| Comparative Example 6 | Ink 16 | 64 | 122 | 2.31 | — | 22.4 | ○ | ○ | X |

Note
[1)] Viscosity at a degree of concentration of 65%; not concentrated to 60%.

As apparently shown in Table 6, it was confirmed that the inks obtained in Examples 1 to 17 were excellent in total evaluation of the dot size on a low-water absorbing recording medium, spread of the dot size, optical density, gloss and rub fastness as compared to the inks obtained in Comparative Examples 1 and 4 to 6.

Reference Example

The same ink-jet printer as used in Experimental Example 2 was loaded with the respective water-based inks 1 to 9, 17 to 23, 11 and 14 to 16 obtained in Examples 1 to 9 and 11 to 17 and Comparative Examples 1 and 4 to 6, respectively, and the A4 solid image (monochrome) printing was carried out on plain paper "4200" (available from Fuji Xerox Co., Ltd.) at 23° C. and 50% RH under the printing condition of "plain paper; Fast; no color matching", thereby obtaining the following printed matters 5 and 6.

The printed matter 5 thus obtained after printing was allowed to stand at 23° C. and 50% RH for 24 h and then dried, whereas the printed matter 6 thus obtained after printing was allowed to stand at 23° C. and 50% RH for 30 s and then dried.

The printed matter 5 was subjected to the same measurement and evaluation for optical density as in Experimental Example 2. Also, the printed matters 5 and 6 were subjected to the same rub fastness test as in Experimental Example 4. The results are shown in Table 7.

TABLE 7

| Reference | Optical density | Rub fastness | |
|---|---|---|---|
| Example | Printed matter 5 | Printed matter 5 | Printed matter 6 |
| Ink 1 | 0.92 | ○ | ○ |
| Ink 2 | 0.90 | ○ | ○ |
| Ink 3 | 0.90 | ○ | ○ |
| Ink 4 | 0.90 | ○ | ○ |
| Ink 5 | 0.89 | ○ | ○ |
| Ink 6 | 0.90 | ○ | ○ |
| Ink 7 | 0.92 | ○ | ○ |
| Ink 8 | 0.92 | ○ | ○ |
| Ink 9 | 0.91 | ○ | ○ |
| Ink 17 | 0.90 | ○ | ○ |
| Ink 18 | 0.90 | ○ | ○ |
| Ink 19 | 0.90 | ○ | ○ |
| Ink 20 | 0.89 | ○ | ○ |
| Ink 21 | 0.91 | ○ | ○ |
| Ink 22 | 0.94 | ○ | ○ |
| Ink 23 | 0.69 | ○ | ○ |
| Ink 11 | 0.97 | ○ | ○ |
| Ink 14 | 0.94 | ○ | ○ |
| Ink 15 | 0.94 | ○ | ○ |
| Ink 16 | 0.93 | ○ | ○ |

The water-based inks for ink-jet printing according to the present invention were excellent in spread of the dot size on a low-water absorbing recording medium, optical density, gloss and rub fastness (refer to Table 6). However, as is apparent from Table 7, when printed on a recording medium having a large water absorption, i.e., a high-water absorbing recording medium, the inks 1 to 9 obtained in Examples 1 to 9 and the inks 17 to 23 obtained in Examples 11 to 17 were excellent in rub fastness to a similar extent, but poor in optical density, as compared to the inks 11 and 14 to 16 obtained in Comparative Examples 1 and 4 to 6.

Thus, it was recognized that the ink-jet printing method according to the present invention can exhibit excellent effects, in particular, when applied to a low-water absorbing recording medium.

INDUSTRIAL APPLICABILITY

In the ink-jet printing method according to the present invention, when printed on a low-water absorbing recording medium, the printed images or characters are excellent in spread of the dot size, optical density, gloss and rub fastness. Therefore, the present invention can be suitably used as an ink-jet printing method in extensive applications.

The invention claimed is:

1. An ink-jet printing method for printing images or characters on a recording medium using a water-based ink for ink jet printing, in which the water-based ink comprises pigment-containing water-insoluble polymer particles A, water-insoluble polymer particles B, an organic solvent C and water;

the water-insoluble polymer particles A comprises a water-insoluble polymer (a) containing a constitutional unit derived from an ionic monomer (a-1), a constitutional unit derived from an aromatic ring-containing hydrophobic monomer (a-2) and a constitutional unit derived from a hydrophilic monomer (a-3) represented by the formula (1):

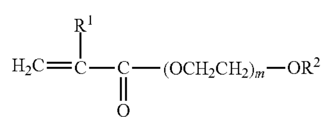

(1)

wherein $R^1$ is a hydrogen atom or a methyl group; $R^2$ is a hydrogen atom, an alkyl group having not less than 1 and not more than 20 carbon atoms or a phenyl group whose hydrogen atom may be substituted with an alkyl group having not less than 1 and not more than 9 carbon atoms; and m represents an average molar number of addition of ethyleneoxy groups and is a number of not less than 7 and not more than 100, the constitutional unit derived from the hydrophilic monomer (a-3) being present in an amount of not less than 13% by mass and not more than 45% by mass on the basis of whole constitutional units in the water-insoluble polymer (a);

the organic solvent C comprises one or more organic solvents having a boiling point of 90° C. or higher, and has an average boiling point of 250° C. or lower as a weighted mean value of boiling points that are weighted by a content (% by mass) of respective organic solvents in the organic solvent C; and the recording medium has a water absorption of not less than 0 $g/m^2$ and not more than 10 $g/m^2$ as measured in a pure water contact time of 100 ms.

2. The ink jet printing method according to claim 1, wherein the organic solvent C comprises at least one compound selected from the group consisting of a polyhydric alcohol and a polyhydric alcohol alkyl ether.

3. The ink-jet printing method according to claim 1, wherein a content of the at least one compound selected from the group consisting of a polyhydric alcohol and a polyhydric alcohol alkyl ether in the organic solvent C is 80% by mass or more.

4. The ink jet printing method according to claim 1, wherein the organic solvent C comprises at least one compound selected from the group consisting of propylene glycol, diethylene glycol and dipropylene glycol monomethyl ether, and glycerin.

5. The ink-jet printing method according to claim 1, wherein the aromatic ring-containing hydrophobic monomer (a-2) comprises at least one monomer selected from the group consisting of a styrene-based monomer, an aromatic group-containing (meth)acrylate and a styrene-based macromonomer.

6. The ink-jet printing method according to claim 1, wherein the ionic monomer (a-1) is a carboxylic acid monomer.

7. The ink-jet printing method according to claim 1, wherein a content of the constitutional unit derived from the ionic monomer (a-1) in the water-insoluble polymer (a) is not less than 3% by mass and not more than 40% by mass.

8. The ink-jet printing method according to claim 1, wherein a content of the constitutional unit derived from the aromatic ring-containing hydrophobic monomer (a-2) in the water-insoluble polymer (a) is not less than 20% by mass and not more than 80% by mass.

9. The ink jet printing method according to claim 1, wherein a mass ratio of the component (a-1) to a sum of the component (a-2) and the component (a-3) {component (a-1)/[component (a-2)+component (a-3)]} is not less than 0.03 and not more than 0.50.

10. The ink-jet printing method according to claim 1, wherein a content of the pigment in the water-based ink is not less than 1% by mass and not more than 15% by mass.

11. The ink-jet printing method according to claim 1, wherein a content of the water-insoluble polymer (a) in the water-based ink is not less than 0.5% by mass and not more than 6% by mass.

12. The ink-jet printing method according to claim 1, wherein a content of the water-insoluble polymer particles B in the water-based ink is not less than 1.0% by mass and not more than 10% by mass.

13. The ink-jet printing method according to claim 1, wherein a content of the organic solvent C in the water-based ink is not less than 20% by mass and not more than 60% by mass.

14. The ink-jet printing method according to claim 1, wherein the pigment-containing water-insoluble polymer particles A in the water-based ink has an average particle size of not less than 40 nm and not more than 150 nm.

15. The ink-jet printing method according to claim 1, wherein the water-insoluble polymer particles B in the water-based ink has an average particle size of not less than 10 nm and not more than 300 nm.

16. The ink-jet printing method according to claim 1, wherein the water-insoluble polymer particles B contain no colorant.

17. The ink-jet printing method according to claim 1, wherein the water-insoluble polymer particles B comprise at least one compound selected from the group consisting of acrylic resin, a polyester resin, a vinyl chloride resin, and an urethane resin.

18. The ink jet printing method according to claim 1, wherein the recording medium is a coated paper or a film.

* * * * *